(12) United States Patent
Shinbata

(10) Patent No.: US 6,594,380 B2
(45) Date of Patent: *Jul. 15, 2003

(54) IMAGE DISCRIMINATION APPARATUS AND IMAGE DISCRIMINATION METHOD

(75) Inventor: Hiroyuki Shinbata, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,873

(22) Filed: Sep. 14, 1998

(65) Prior Publication Data

US 2002/0094113 A1 Jul. 18, 2002

(30) Foreign Application Priority Data

Sep. 22, 1997 (JP) .............................. 9-256895
Apr. 7, 1998 (JP) ........................... 10-094966
Aug. 25, 1998 (JP) ........................... 10-239104

(51) Int. Cl.$^7$ ................................................ G06K 9/00
(52) U.S. Cl. ..................................................... 382/132
(58) Field of Search ................................ 382/128, 132, 382/194, 203, 204, 286, 288; 128/922

(56) References Cited

U.S. PATENT DOCUMENTS

| | | | | |
|---|---|---|---|---|
| 4,922,915 A | * | 5/1990 | Arnold et al. .............. | 382/128 |
| 4,951,201 A | * | 8/1990 | Takeo et al. ................ | 382/128 |
| 5,592,571 A | * | 1/1997 | Peters ......................... | 382/261 |
| 5,680,471 A | * | 10/1997 | Kanebako et al. .......... | 382/128 |
| 5,946,413 A | * | 8/1999 | Shibata et al. .............. | 382/174 |
| 6,011,862 A | * | 1/2000 | Doi et al. .................... | 382/132 |

* cited by examiner

Primary Examiner—Andrew W. Johns
Assistant Examiner—Shervin Nakhjavan
(74) Attorney, Agent, or Firm—Morgan & Finnegan, LLP

(57) ABSTRACT

According to the present invention, provided are an image discrimination apparatus and an image discrimination method, for extracting data for a feature from an autoradiograph that is obtained by using a radioactive device to irradiate a subject with radioactive rays, and for employing the obtained data for the feature to determine the category of the subject in the autoradiograph. According to the image discrimination apparatus and the image discrimination method, an autoradiographic signal is entered, a plain image area indicated by the autoradiographic signal is detected, an area is extracted other than the detected plain image area and an area having a predetermined width that contacts the plain image area, the maximum density value of a pixel, of those pixels that constitute the area, and the coordinates of the pixel in the autoradiograph are calculated, the feature data for the autoradiograph is calculated by employing the maximum density value of the pixel and its coordinates in the autoradiograph, and the obtained feature data are employed to identify the category of the subject in the autoradiograph. As a result, the feature data for an image can be extracted accurately and efficiently, and the category of the image can be identified automatically and precisely by using the extracted feature data.

75 Claims, 20 Drawing Sheets

FRONT

SIDE

SIDE

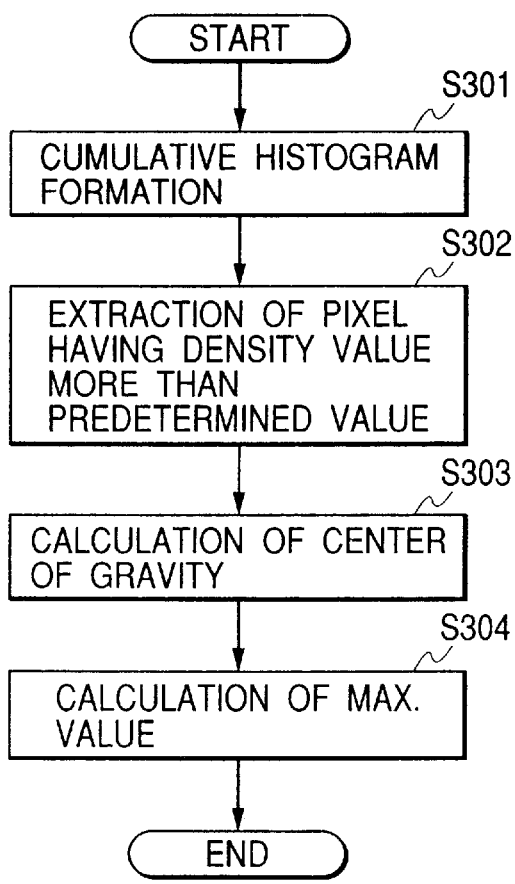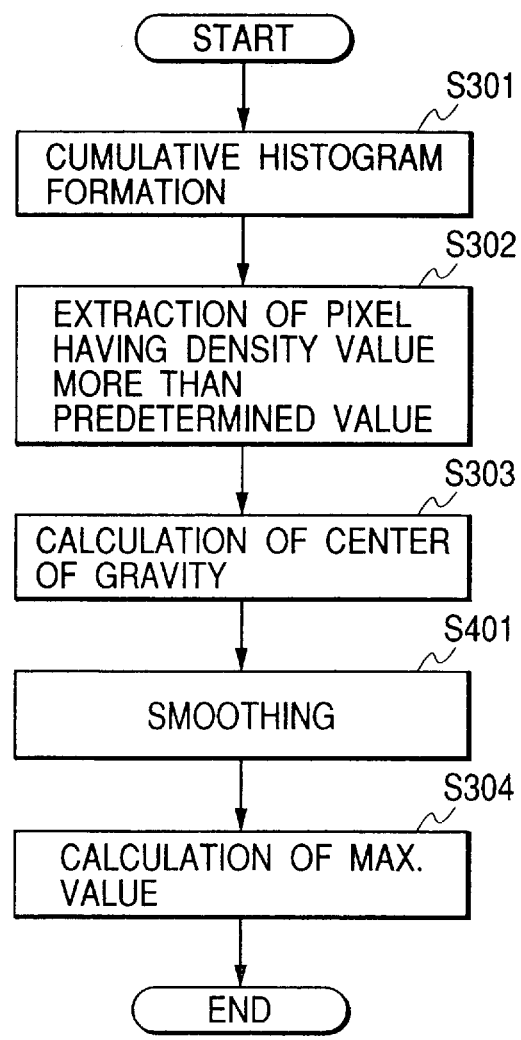

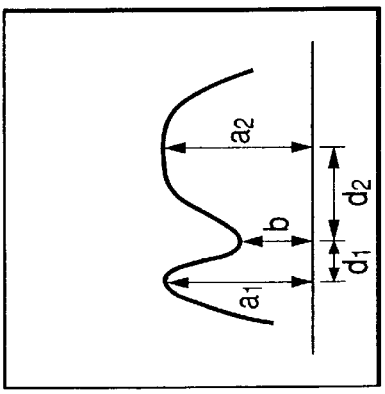
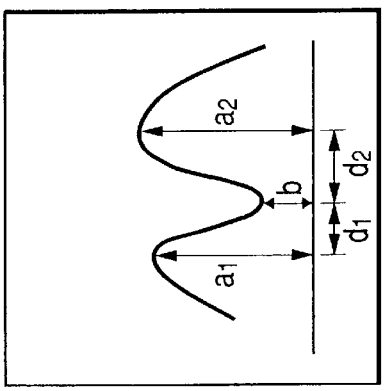
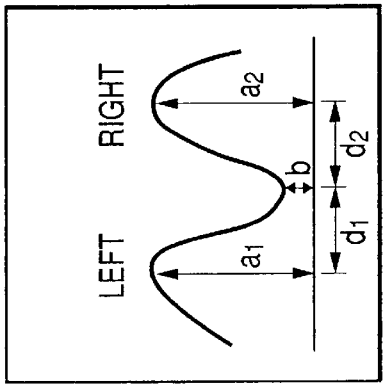
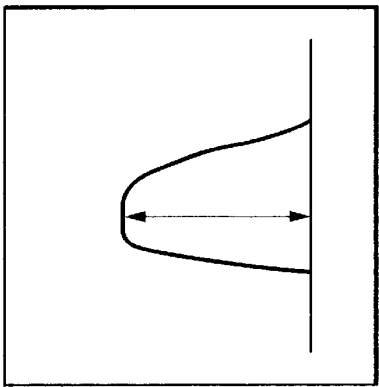
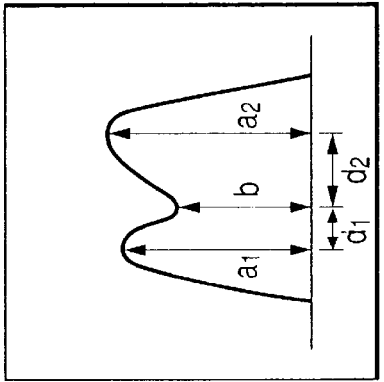

FRONT

SIDE

SIDE

IMAGE DISCRIMINATION APPARATUS AND IMAGE DISCRIMINATION METHOD

BACKGROUND OF THE INVENTION

1. Field of the Invention

The present invention relates to an image discrimination apparatus and an image discrimination method for extracting the data for a feature from an image, and for employing this feature data to automatically identify the category of a subject in the image or the posture of the subject when radiographed; and in particular to an image discrimination apparatus and an image discrimination method for employing the data for a feature, such as the shape for a profile in an arbitrary area of an autoradiograph, to identify a portion or the posture of a subject, such as the front or the side of the lungs, when radiographed.

2. Related Background Art

Currently, in accordance with recent developments in digital techniques, an autoradiograph of a chest is digitized, image processing of the digital image is performed, and the resultant image is either displayed on a CRT or is printed.

In chest radiography it is common for the posture of a subject to differ in consonance with the purpose of the radiograph. For example, the radiographic posture will vary when a radiograph is taken from the front or from the side of the lungs, i.e., the portion to be radiographed (hereinafter referred to as a category) varies in accordance with the purpose. The distribution of densities differs depending on the posture, and the width of the density distribution in a target area is also varied. Therefore, in general, different image processing procedures should be employed for each radiographic posture in accordance with whether an image is to be displayed or is to be printed. Thus, for an image processing apparatus the radiographic posture must be input so that the apparatus will perform the image processing that is appropriate for the posture.

However, a great deal of manual labor is required when the radiographic posture is input each time image processing is performed, and input errors tend to accumulate.

To resolve this shortcoming, an automatic discrimination method is proposed whereby the data for the feature of an image is employed to automatically detect the posture of a subject. According to this method, a cumulative histogram for an image is prepared, and the value of a change rate substantially in the center of the cumulative histogram is employed to identify the category of the image.

With another automatic discrimination method, a specific amount of data for a feature is extracted from an image in order to easily understand the image data in an area to be examined, and the data for the feature, such as the maximum or the minimum value for the density of the body, is employed to determine an image processing condition.

To extract the data for a feature according to this method, as is shown in FIG. 1, for example, a density value histogram for an overall image (solid line A in FIG. 1) is prepared, and the maximum value and the minimum value are acquired from the shape of the histogram. Furthermore, to extract the data for a feature while a threshold value for a binary operation is being changed, the labeling process is performed to obtain an area, and for the area the maximum value and the minimum value are calculated under a specified condition.

When the conventional automatic discrimination method is used, however, a parameter for identifying the category of an image is fixed in advance, and the category of the image can not be identified unless a static condition prevails when it is exposed.

Furthermore, since when this method is used the category of an image is identified based on a change rate appearing substantially in the center portion of a cumulative histogram, deterioration of the accuracy of the discrimination process will occur when the interval between the maximum density value and the minimum density value changes.

In addition, with this method, when the exposure condition is changed, a parameter for identifying the category of an image must also be changed, and since a great deal of skill is required to perform this alteration, the parameter can not easily be changed.

Further, according to the conventional feature data extraction method, which was employed to prepare the density value histogram shown in FIG. 1 and to extract the data for a feature, the density value histogram in FIG. 1 was formed by adding the distribution of the internal density value of a body (broken line a in FIG. 1) to the distribution of the density value (broken line b in FIG. 1) in a plain image area and in the internal area of a body that contacts the plain image area at a constant interval. A problem has arisen in that the maximum density value max, acquired from the shape of the histogram, differs from the actual maximum density value max2 in the internal area of the body.

Moreover, since when using the conventional feature data extraction method the processing is performed sequentially by performing the labeling process at the same time as the threshold value for the binary operation is being changed, the processing is not performed efficiently and requires an extended period of time for its execution.

When one of the conventional feature data extraction methods that have such problems is employed as the automatic discrimination method, a natural result is that deterioration of the discrimination accuracy occurs.

SUMMARY OF THE INVENTION

It is, therefore, one objective of the present invention to provide an image discrimination apparatus and an image discrimination method that can resolve the above described shortcomings.

It is another objective of the present invention to provide an image discrimination apparatus and an image discrimination method for accurately and efficiently extracting the data for a feature of an image, and for automatically and precisely identifying the category of the image by using the extracted data for the feature.

To achieve the above objectives, according to one aspect of the present invention, an image discrimination apparatus, which extracts the data for a feature from an autoradiograph that is produced when a subject is irradiated with radioactive rays by a radioactive device and which employs the obtained data for the feature to identify the category of the subject in the autoradiograph, comprises:

area extraction means for entering an autoradiographic signal, for detecting a plain image area indicated by the autoradiographic signal, and for extracting an area other than the plain image area that is detected and an area, which is in contact with the plain image area, having a predetermined width;

maximum density value calculation means for calculating the maximum density value for one pixel of those pixels that constitute the area, and the coordinates of the location of the pixel in the autoradiograph;

feature data calculation means for calculating the data for the feature of the autoradiograph by employing the maximum density value for the pixel and the coordinates for the pixel in the autoradiograph, both of which are obtained by the maximum density value calculation means; and discrimination means for employing the data for the feature obtained by the feature data calculation means to identify the category of the subject in the autoradiograph.

It is an additional objective of the present invention to provide an image discrimination apparatus and an image discrimination method for accurately and efficiently extracting the data for a feature for an image and for employing the data for the feature to precisely and automatically identify the posture of a subject in the image.

To achieve this additional objective, according to another aspect of the present invention, an image discrimination apparatus, which identifies the posture of a subject in an autoradiograph produced when the subject is radiated with radioactive rays by a radioactive device, comprises:

comparison means for entering an autoradiographic signal, for detecting a density value for a pixel that constitutes a first area, which corresponds to a first autoradiograph portion indicated by the autoradiographic signal, and a density value for a pixel that constitutes a second area, which corresponds to a second portion, and for comparing the two density values; and discrimination means for employing the autoradiograph to determine the radiographic posture of a subject.

It is a further objective of the present invention to provide an image discrimination apparatus and an image discrimination method for employing an autoradiograph to automatically and efficiently identify the precise radiographic posture of a subject, such as the portion of the subject that was radiographed or the front or the side of the lungs of the subject.

To achieve this further objective, according to an additional aspect of the present invention, an image discrimination apparatus, which discriminates the posture of a subject in an autoradiograph that is obtained by a radioactive device radiating the subject with radioactive rays, comprises:

profile preparation means for entering an autoradiographic signal, and for preparing a profile for the density values of pixels that are positioned along a line passing through predetermined coordinates in a specific area, in the autoradiograph, that is indicated by the autoradiographic signal;

dent portion detection means for detecting a portion wherein a change in the density values for the pixels in the profile, which is prepared by the profile preparation means, has the shape of a dent;

ratio calculation means for calculating a ratio of a density value for a pixel in the portion, wherein the change in the density values of the pixels has the shape of a dent, to a density value for a pixel in the profile prepared by the profile preparation means; and discrimination means for employing the ratio obtained by the ratio calculation means to identify the radiographic posture of the subject in the autoradiograph.

Other objectives and features of the present invention will become apparent during the course of the detailed description of the preferred embodiments given while referring to the following drawings.

BRIEF DESCRIPTION OF THE DRAWINGS

FIG. 7 is a flowchart for explaining a processing program performed by an image discrimination apparatus according to a second embodiment of the present invention;

FIG. 8 is a flowchart for explaining the processing program in FIG. 7 to which a smoothing process has been added;

FIGS. 16A, 16B, 16C, 16D, 16E and 16F are diagrams for explaining example profiles for a lung area;

DETAILED DESCRIPTION OF THE PREFERRED EMBODIMENTS

The preferred embodiments of the present invention will now be described while referring to the accompanying drawings.

First, a first embodiment of the present invention will be explained.

Figure 1:
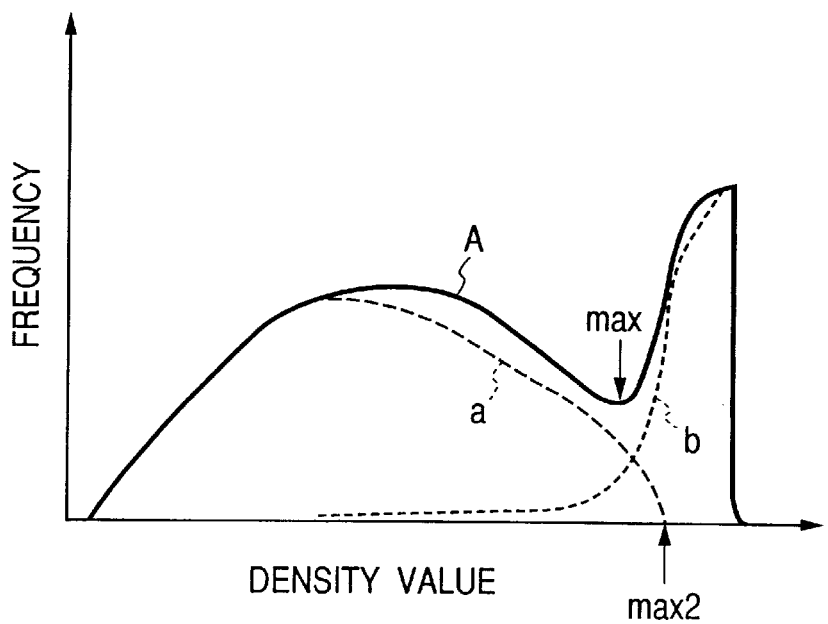
FIG. 1 is a graph for explaining a feature data extraction method employed for a conventional automatic discrimination method.
Figure 2:
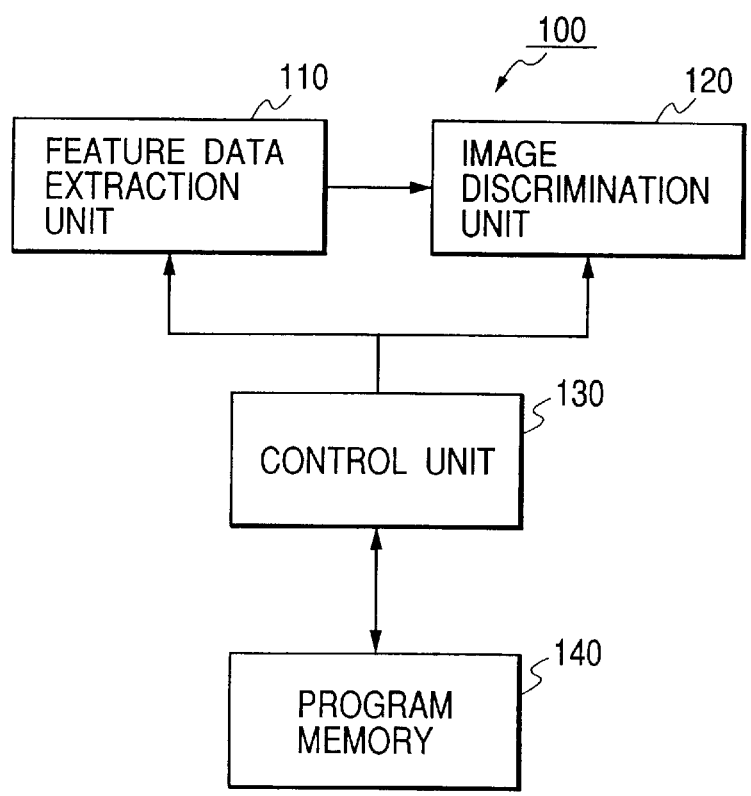
FIG. 2 is a block diagram illustrating the arrangement of an image discrimination apparatus according to a first embodiment of the present invention.

An image discrimination method according to the present invention is performed, for example, by an image discrimination apparatus 100 shown in FIG. 2. The present invention is applied for the image discrimination apparatus 100.

Specifically, as is shown in FIG. 2, the image discrimination apparatus 100 comprises: a feature data extraction unit 110; an image discrimination unit 120, for receiving the data for a feature from the feature data extraction unit 110; a control unit 130, for controlling the feature data extraction unit 110 and the image discrimination unit 120; and a program memory 140 that is to be accessed by the control unit 130.

Figure 3:
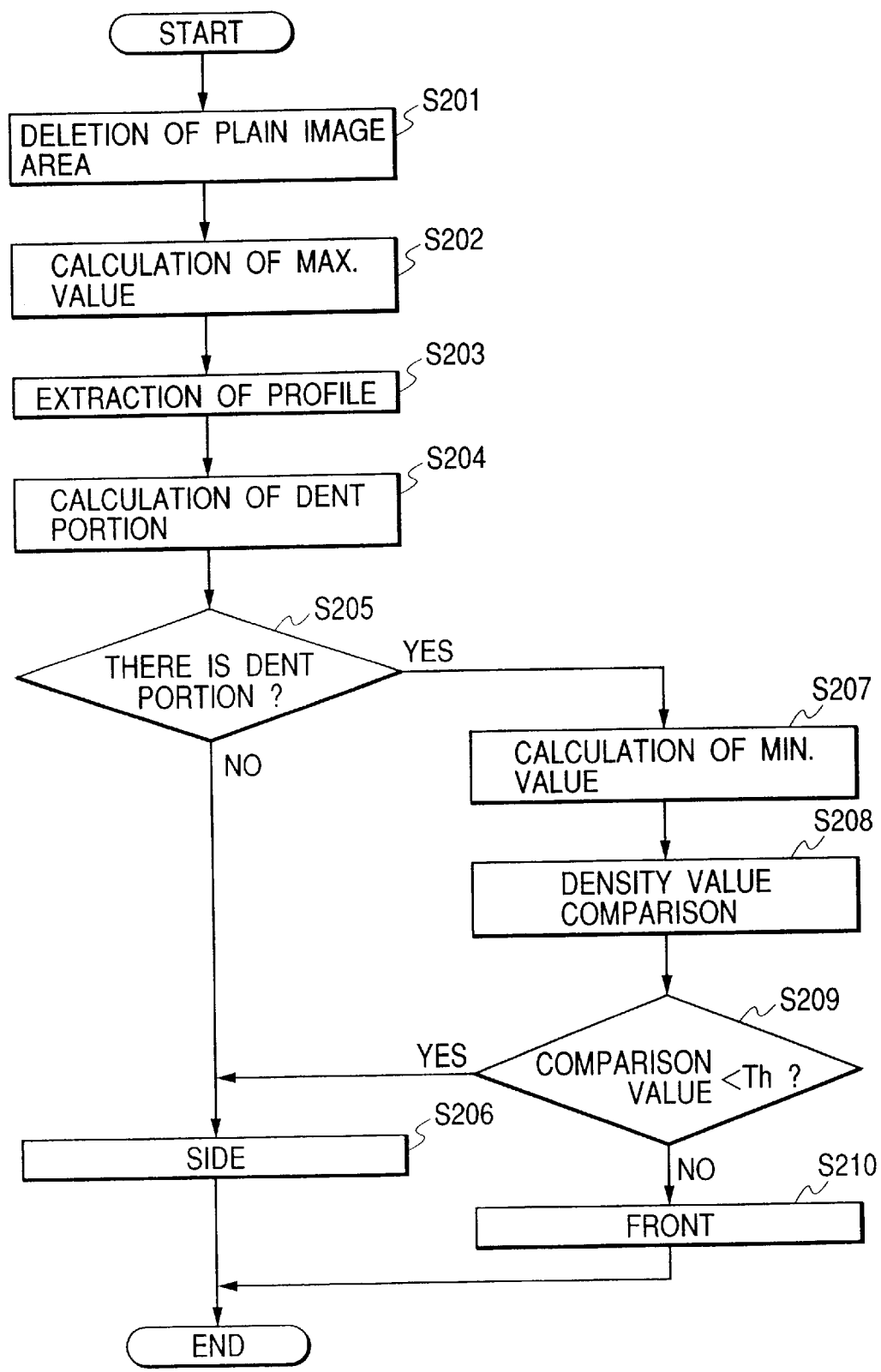
FIG. 3 is a flowchart for explaining a processing program to be executed by the image discrimination apparatus.

A processing program as is shown in the flowchart in FIG. 3 is stored in advance in the program memory 140. When the processing program is read and executed by the control unit 130, the feature data extraction unit 110 and the image discrimination unit 120 perform their operations, which will be described later.

Figure 4:
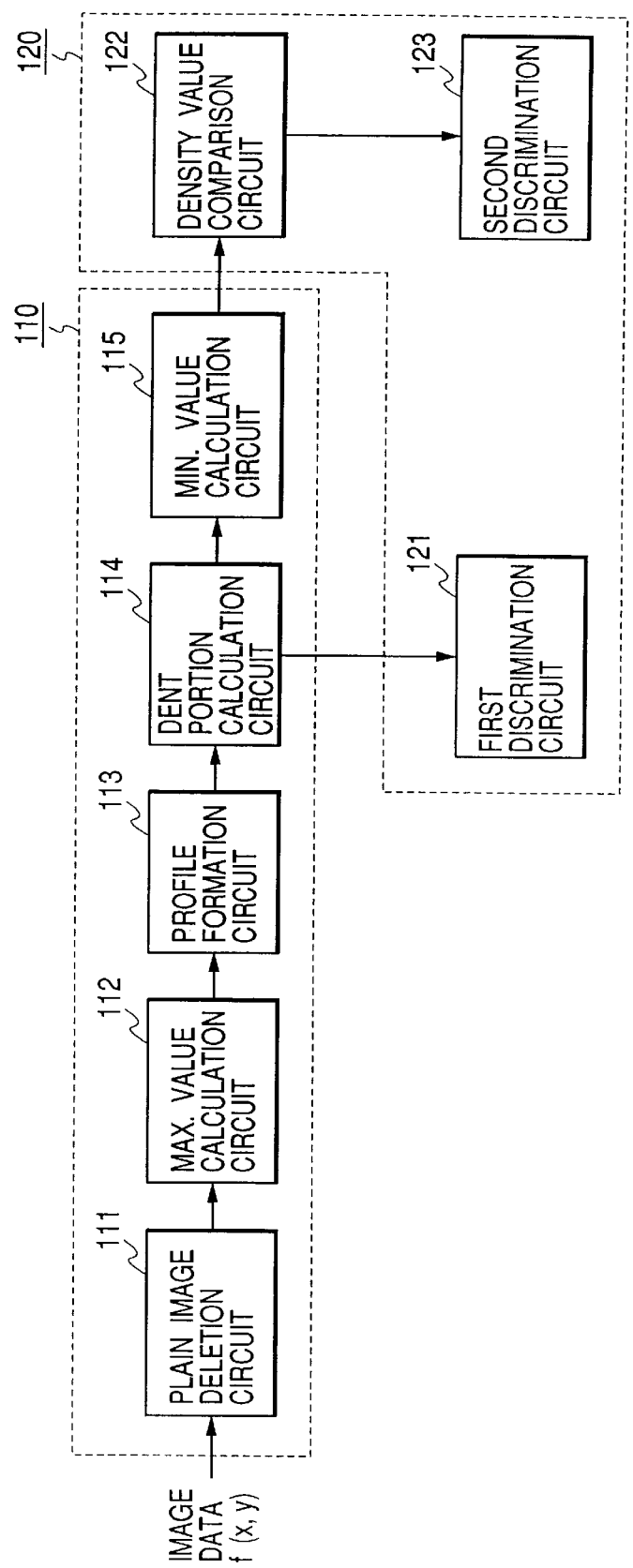
FIG. 4 is a block diagram showing the detailed arrangement for a feature data extraction unit and an image discrimination unit in the image discrimination apparatus.
Figure 5:
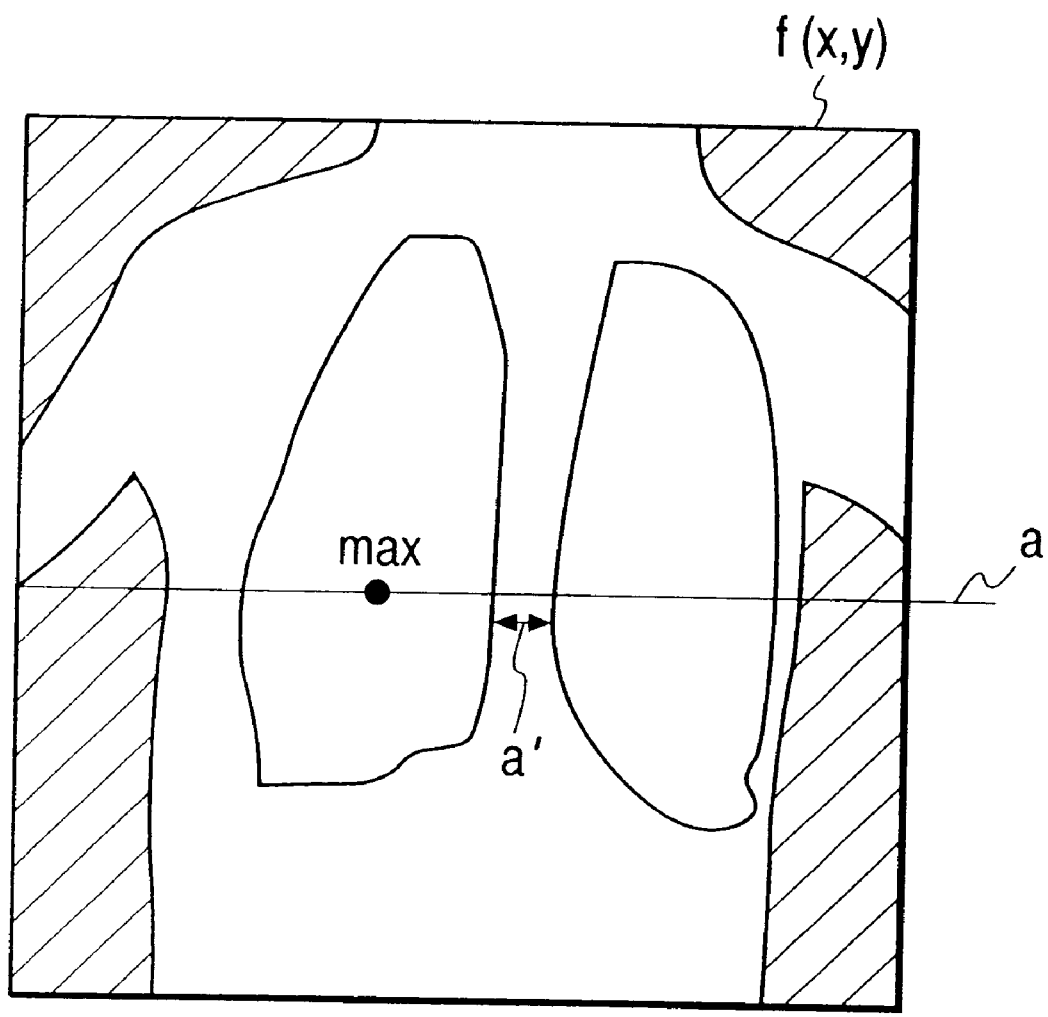
FIG. 5 is a diagram for explaining example image data to be supplied to the image discrimination apparatus.

As is shown in FIG. 4, the feature data extraction unit 110 comprises: a plain image deletion circuit 111 for deleting from input image data (in this embodiment, chest autoradiographic data f(x, y) in FIG. 5) a plain image (a shaded portion in FIG. 5) and a body image that contacts the plain image at a constant interval; a maximum value calculation circuit 112, for employing the area that has not been deleted by the plain image deletion circuit 111 to calculate the maximum density value and the coordinates of that value; a profile forming circuit 113, for producing a profile that passes through the coordinates of the maximum density value obtained by the maximum value calculation circuit 112; a dent portion calculation circuit 114, for calculating a dent portion using the profile that is formed by the profile forming circuit 113; and a minimum value calculation circuit 115, for employing the dent portion obtained by the dent portion calculation circuit 114 to calculate the minimum density value and the coordinates of that value.

The image discrimination unit 120 comprises: a first discrimination circuit 121, for identifying the radiographic posture using the dent portion obtained by the dent portion calculation circuit 114; a density value comparison circuit 122, for comparing the minimum density value, which is produced by the minimum value calculation circuit 115, with a density value for the image in the profile that is located at a specific distance from the coordinates of the minimum density value; and a second discrimination circuit 123, for identifying a radiographic posture using the results obtained by the density value comparison circuit 122.

A feature data extraction method according to the present invention is employed by the above described feature data extraction unit 110. For this unit 110 the feature data extraction device according to the present invention is employed.

Furthermore, a memory medium according to the present invention is employed for the program memory 140 in which the processing program in FIG. 3 is stored.

When the processing program shown in FIG. 3 that is stored in the program memory 140 is read and executed by the control unit 130, the thus structured image discrimination apparatus 100 performs the following procedures.

First, the plain image deletion circuit 111 receives image data f(x, y) and replaces, with 0 pixels, a plain image in the radiated area and a body image that contacts the plain image at a constant interval (step S201).

Specifically, image conversion represented by equation (1), $$f1(x, y) = f(x, y) \times \prod_{x1=-d1}^{x1=d1} \prod_{y1=-d2}^{y1=d2} \text{sgn}(x+x1, y+y1) \quad (1)$$

is performed for the input image data f(x, y).

"f1(x, y)" in equation (1) represents image data that are obtained by deleting, from the image data f(x, y), the plain image, and the body image that contacts the plain image at a constant interval.

"sgn(x,y)" is represented by equation (2), sgn(x,y)=0: f(x, y)≧Th1 sgn(x,y)=1: others  (2)

wherein Th1 is a constant that is defined through experimentation, and d1 and d2 are constants for determining the interval in order to delete the body image.

The maximum value calculation circuit 112 calculates the maximum density value max, and its coordinates, for the image data f1 (x, y) that are obtained by the plain image deletion circuit 111 (step S202).

Next, the profile forming circuit 113 forms a profile that passes through the coordinates of the maximum density value obtained by the maximum value calculation circuit 112 and that, for example, is perpendicular to the body (step S203).

It should be noted that, as is shown in FIG. 5, a profile is to be formed that passes through the maximum value max along a horizontal axis "a".

The dent portion calculation circuit 114 uses the profile formed by the profile forming circuit 113 to calculate a dent portion (step S204).

Specifically, the dent portion calculation circuit 114 calculates an x portion that is represented by expression (3), (f1(x−d,y1)−f1(x,y1))>0 &&

(f1(x+d,y1)−f1(x,y1))>0  (3).

"y1" in expression (3) represents the y coordinate of the maximum density value that is obtained by the maximum value calculation circuit 112, and "d" represents a constant that is defined through experimentation, etc.

The first discrimination circuit 121 determines whether the dent portion has been calculated by the dent portion calculation circuit 114 (step S205). When the dent portion has not been acquired, it is ascertained that for the radiographic posture the input image data f(x, y) are those for the "side of lungs" (step S206). This processing is thereafter terminated.

When the dent portion has been acquired, program control moves to step S207.

Figure 6A:
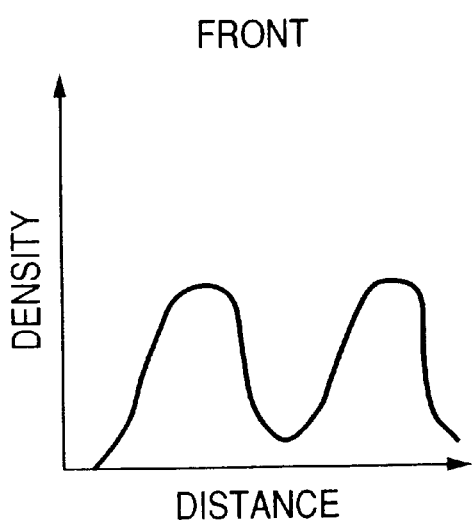
FIGS. 6A, 6B and 6C are graphs for explaining profiles for images produced when the postures for radiography are "the front of the lungs" and "the side of the lungs"
Figure 6C:
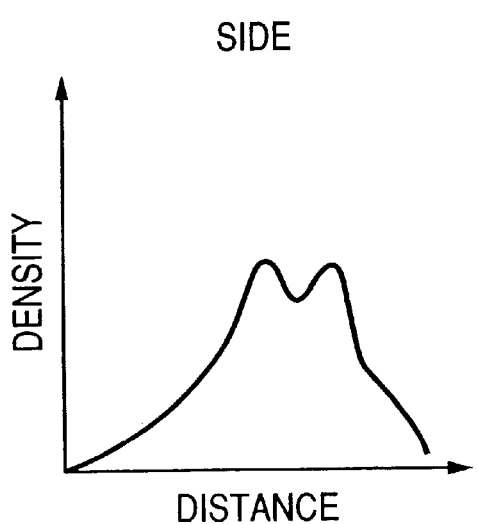
Figure 6B:
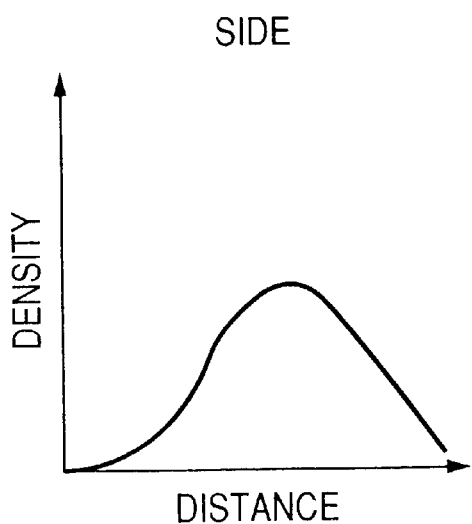

In FIG. 6A is shown a standard profile generated from the image for the front of the lungs, and in FIG. 6B is shown a standard profile generated from the image for the side of the lungs.

As is apparent from those graphs, when the presence or absence of the dent portion is determined for the standard profiles for the chest autoradiograph, the radiographic posture can be identified as either the "front of the lungs" or the "side of the lungs". In other words, when the dent portion is calculated by the dent portion calculation circuit 114, it is ascertained that the radiographic posture is the "front of the lungs", and when the dent portion is not acquired, it is ascertained that the radiographic posture is the "side of the lungs".

However, as is shown in FIG. 6C, when the "side of the lungs" is the radiographic posture, a dent portion may also be present. Thus, when a posture determination is made that is based on only the presence or absence of a dent portion, a discrimination error may occur.

Therefore, when at step S205 it is determined that a dent portion is present, from this it is not simply ascertained that the radiographic posture is the "front of the lungs", and program control moves to step S207.

That is, when from the calculations performed by the dent portion calculation circuit 114 it is determined that a dent portion is present, first, the minimum value calculation circuit 115 uses the dent portion that is acquired by the dent portion calculation circuit 114 to calculate the minimum density value and the coordinates for that value. As a result, in FIG. 5, the minimum value for mediastinum a' along the horizontal axis that passes through the maximum value max, and the coordinates of the minimum value are calculated (step S207).

Sequentially thereafter, the density value comparison circuit 122 compares the minimum density value, obtained by the minimum value calculation circuit 115, with the density value for the profile that is located at constant distance d1 from the coordinates for the minimum value (step S208).

And then the second discrimination circuit 123 determines the radiographic posture using the result of the comparison (comparison value), which is obtained by the density value comparison circuit 122, and the constant Th2, which is defined through experimentation (step S209).

For example, when expression (4), $$f1(xm-d, y1)/f1(xm, y1) > Th2 \,\&\&$$

$$f1(xm+d, y1)/f1(xm, y1) > Th2 \quad (4)$$

is satisfied, it is ascertained that the input image data f(x, y) for the radiographic posture are those for the "front of the lungs" (step S210). The processing is thereafter terminated.

When expression (4) is not satisfied, it is ascertained that the image data f(x, y) for the radiographic posture are those for the "side of the lungs" (step S206). The processing is thereafter terminated.

In this explanation, expression (4), i.e., the ratio of the density values, is employed by the second discrimination circuit 123 to identify the radiographic posture. However, a difference between the density values may also be employed to identify the posture.

For example, when expression (5), $$f1(xm-d, y1)-f1(xm, y1) > Th2 \,\&\&$$

$$f1(xm+d, y1)-f1(xm, y1) > Th2 \quad (5),$$

is satisfied, it is ascertained that the radiographic posture is the "front of the lungs". When expression (5) is not satisfied, it is ascertained that the radiographic posture is the "side of the lungs".

As is described above, according to the first embodiment, the plain image and the internal body image that contacts the plain image at a constant interval are deleted, so that the maximum density value in the internal body image can be accurately and stably extracted within a short period of time.

Furthermore, since the shape of the profile that passes through the maximum density value in the internal body image is employed to identify the radiographic posture, the radiographic posture, without being affected by a change in the radiographic condition, can be accurately determined within a short period of time.

In addition, since the density value for the dent portion has been calculated, the minimum density value in the mediastinum, which lies along the same horizontal axis as that of the maximum density value, can be stably and accurately obtained within a short period of time.

Further, since the second discrimination circuit 123 identifies the radiographic posture using the results of the comparison obtained by the density value comparison circuit 122, even when a dent portion is present in an image profile for the side of the lungs, it is not mistakenly ascertained that the radiographic posture corresponds to one for the front of the lungs. The posture, therefore, can be accurately determined.

A second embodiment will now be described.

In the second embodiment, when the maximum value calculation circuit 112 in FIG. 4 calculates the maximum density value and its coordinates using an image from which a plain image and an image that contacts the plain image at a constant interval have been deleted, by using a cumulative histogram a pixel that has a density value that is equal to or greater than a constant density value is regarded as the maximum value, while the coordinates for the barycenter of the pixel are regarded as the coordinates for the maximum value.

Specifically, a maximum value calculation circuit 112 performs an operation in accordance with the processing program shown, for example, in the flowchart in FIG. 7.

The processing program in FIG. 7 is stored in advance in a program memory 140, and is read and executed by a control unit 130.

In addition, a memory medium according to the present invention is employed as the program memory 140 in which the processing program is stored.

First, a cumulative histogram is formed for an image obtained by a plain image deletion circuit 111 (an image from which a plain image, and an image that contacts the plain image at a constant interval have been extracted) (step S301).

Then, a pixel having a density value that is equal to or greater than that for constant Th3, which is defined through experimentation, is extracted from the cumulative histogram formed at step S301 (step S302).

The barycenter of the pixel extracted at step S302 is calculated (step S303), and the coordinates of the barycenter and its density value are respectively regarded as the coordinates for the maximum density value and the maximum density value that are output to a profile forming circuit 113 at the following stage (step S304).

As is described above, by using the cumulative histogram in the second embodiment, the barycenter having a density value that is equal to or greater than a constant density value (Th3) is regarded as the maximum density value, so that its coordinates are defined as the coordinates for the maximum density value, and its density value and its coordinates are employed by the profile forming circuit 113. As a result, noise can be removed and stable data can be obtained for a feature.

After the barycenter of the pixel extracted at step S302 is calculated (step S303), a profile that passes through the barycenter may be smoothed, and the coordinates for the maximum density value and the maximum density value that are employed for the profile forming circuit 113 may be obtained from the smoothed profile.

Specifically, in this case, as is shown in FIG. 8, the processes at steps S301 and S302 are performed in the above described manner, and at step S303 the barycenter of the pixel extracted at step S302 is calculated.

The profile that passes through the coordinates of the barycenter obtained at step S303 is thereafter smoothed (step S401). Employed for this smoothing, for example, is the density average, the middle value in a specific image area, or grayscale morphology.

The maximum density value and the coordinates corresponding to the profile that is smoothed at step S401 are defined as the maximum density and its coordinates and are output to the profile forming circuit 113 at the following stage (step S304).

With this arrangement, the data for the feature can also be consistently and accurately calculated, without being affected by noise.

A third embodiment will now be explained.

Figure 9:
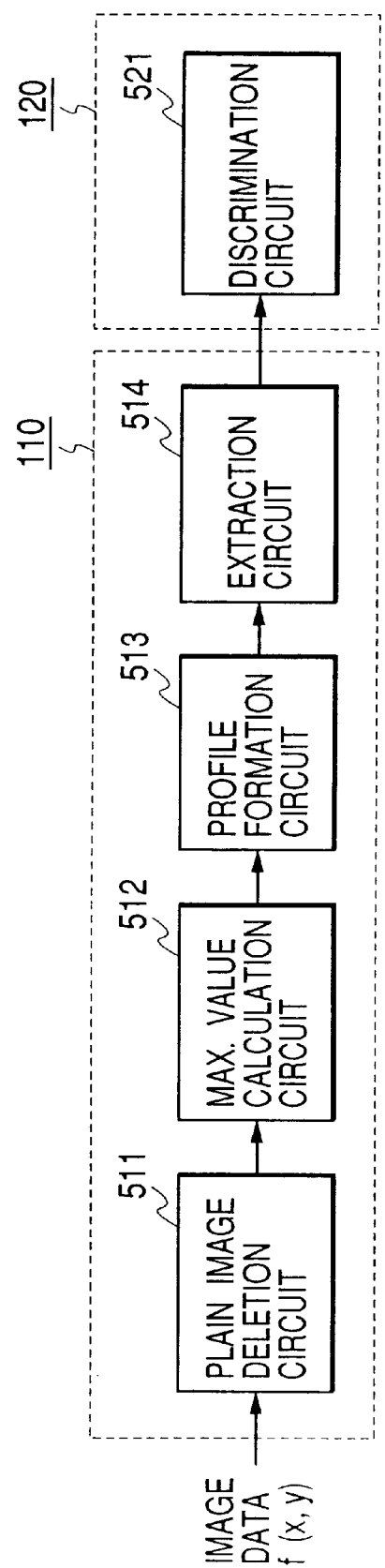
FIG. 9 is a detailed block diagram illustrating a feature data extraction unit and an image discrimination unit in an image discrimination apparatus according to a third embodiment of the present invention.

In this embodiment, the feature data extraction unit 110 and the image discrimination unit 120 in the first embodiment are arranged as is shown in FIG. 9.

Specifically, the feature data extraction unit 110 comprises: a plain image deletion circuit 511, for deleting, from input image data f(x, y), a plain image, and a body image that contacts the plain image at a constant interval; a maximum value calculation circuit 512, for employing the area that has not been deleted by the plain image deletion circuit 511 to calculate the maximum density value and its coordinates; a profile forming circuit 513, for forming a profile that passes through the coordinates of the maximum density value obtained by the maximum value calculation circuit 512; and an extraction circuit 514, for obtaining the data for a feature from the profile that is formed by the profile forming circuit 513.

The image discrimination unit 120 comprises a discrimination circuit 521, for identifying the radiographic posture of an object using the data for the feature that is obtained by the extraction circuit 514.

Figure 10:
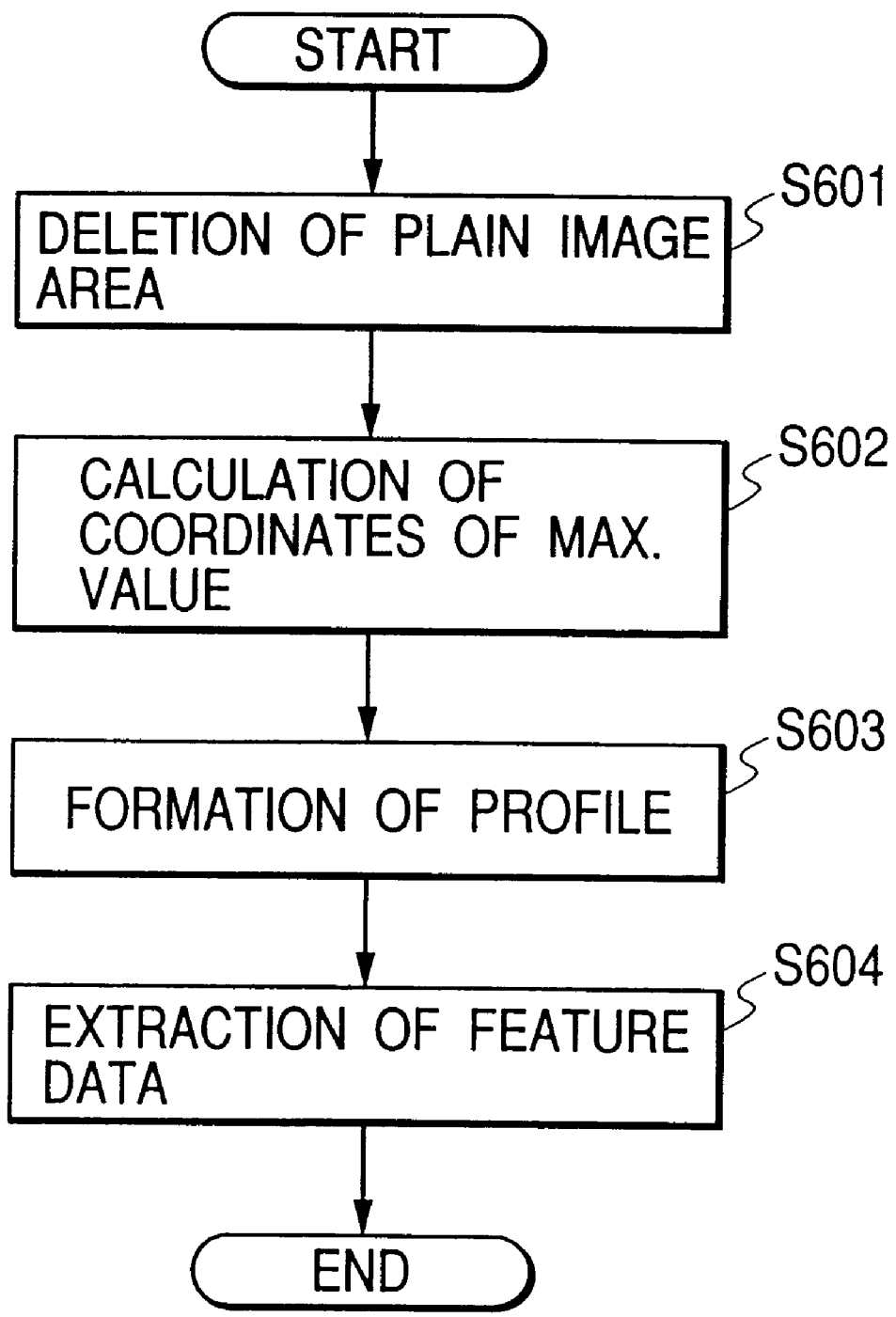
FIG. 10 is a flowchart for explaining a processing program to be executed by the image discrimination apparatus in FIG. 9.

In the third embodiment, a processing program shown in the flowchart in FIG. 10 is stored in advance in a program memory 140, and is read and executed by a control unit 130.

The feature data extraction unit 110 and the image discrimination unit 120 in FIG. 9 initiate the following operations in response to the reading and the execution, by the control unit 130, of the processing program in FIG. 10 that is stored in the program memory 140.

It should be noted that a memory medium according to the present invention is employed for the program memory 140 in which the processing program in FIG. 10 is stored.

First, the plain image deletion circuit 511, as well as the plain image deletion circuit 111, deletes from input image data f(x, y) a plain image, and a body image that contacts the plain image at a constant interval (step S601).

Following this, the maximum value calculation circuit 512, as well as the maximum value calculation circuit 112, calculates the maximum density value max and its coordinates for the image area that has not been deleted by the plain image deletion circuit 511 (step S602).

Figure 11A:
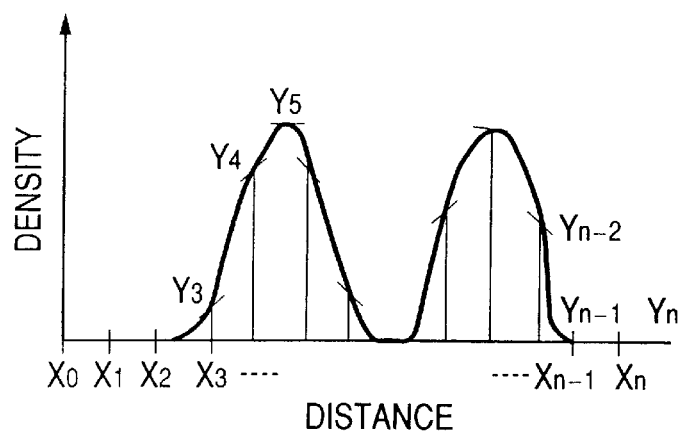
FIGS. 11A and 11B are graphs for explaining the data for the feature extracted by the feature data extraction unit in FIG. 10.
Figure 11B:
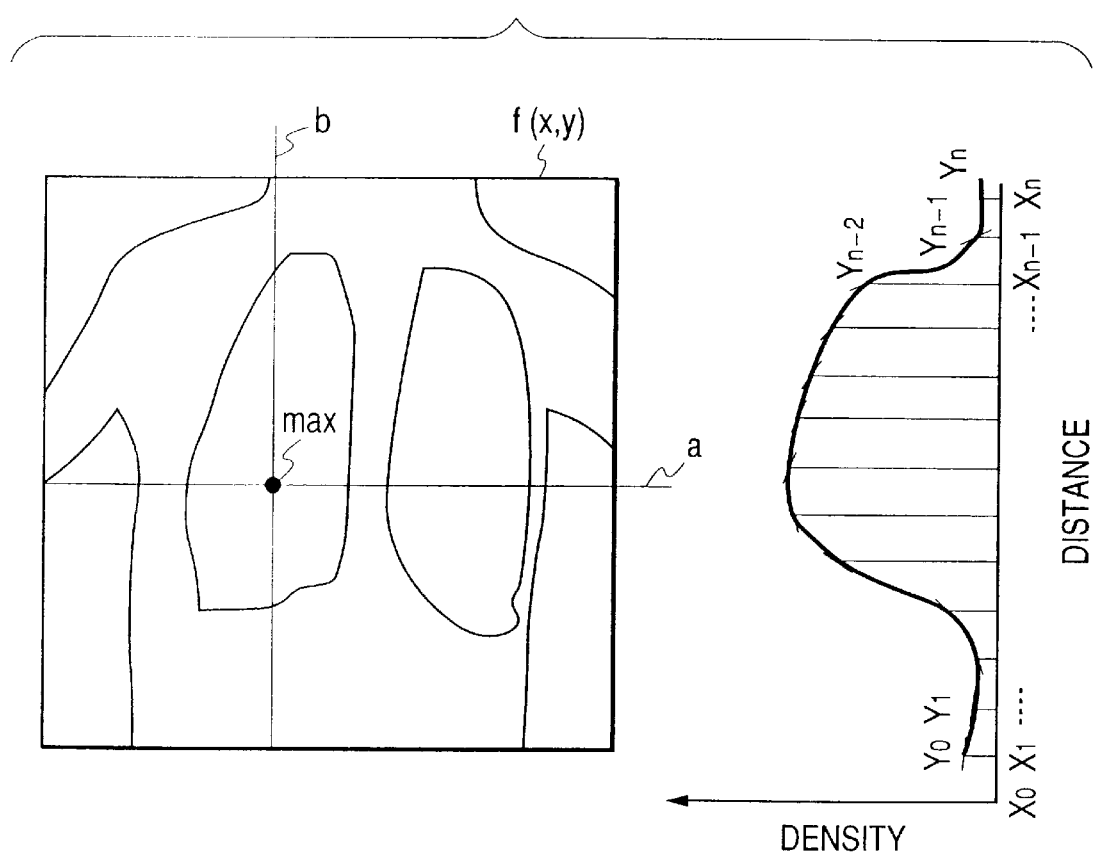

Then, the profile forming circuit 513 forms profiles that pass through the maximum density value max obtained by the maximum density calculation circuit 512, i.e., as is shown in FIGS. 11A and 11B, a profile that travels across the internal area of the lungs along horizontal axis "a," and a profile that travels across the internal area of the lungs along vertical axis "b" (step S603).

The extraction circuit 514 equally divides the profile formed by the profile forming circuit 513, and obtains, as the data for the features, density values $X_0, X_1, \ldots$ and $X_n$ at the division points, and changes $Y_0, Y_1, \ldots$ and $Y_n$ in the density values $X_0, X_1, \ldots$ and $X_n$ at the division points (step S604).

The discrimination circuit 521, by employing the data for the features that are obtained by the extraction circuit 514, performs a neural network process, a discrimination analysis or a regression analysis, and identifies the radiographic posture of the input image data f(x, y) (step S605).

As is described above, according to the third embodiment, since the data for the feature is obtained from the profile that travels across the internal areas of the lungs, the accuracy of the process for identifying the posture can be improved.

In addition, since the data for the feature is obtained from the profile that passes through the maximum density value max in the body image, the lung area need not be extracted, and the data for a feature can be consistently obtained in a short period of time.

The extraction circuit 514 may normalize the width of the image on the profile for which the density value is not "0," and may equally divide the normalized area in order to extract the data for a feature.

As a result, the differences in the sizes of the bodies can be absorbed, and precise and discrete data can be obtained for the feature.

The objectives of the present invention are achieved as follows: a memory medium on which is stored software program code for implementing the functions of a host computer or a terminal in the first to the third embodiments is supplied to a system or to an apparatus, and the computer (or a CPU or an MPU) in the system or the apparatus reads the program code from the memory medium.

In this case, the program code read from the memory medium accomplishes the functions of the above described embodiments, and the memory medium on which such program code is recorded constitutes the present invention.

A memory medium for supplying such program code can be, for example, a ROM, a floppy disk, a hard disk, an optical disk, a magneto optical disk, a CD-ROM, a CD-R, a magnetic tape or a nonvolatile memory card.

In addition, the scope of the present invention includes not only a case where the functions in the first to the third embodiments can be performed when program code is read and executed by the computer, but also a case where, according to an instruction in the program code, an OS running on the computer, etc., performs one part, or all, of the actual processing to accomplish the functions included in the above embodiments.

Furthermore, in order to implement the functions included in the first to the third embodiments, the present invention includes a case where program code, read from a memory medium, is written in a memory that is mounted on a function expansion board inserted into a computer, or a function expansion unit connected to a computer, and in consonance with a program code instruction, a CPU mounted on the function expansion board, or on the function expansion unit, performs one part, or all, of the actual processing.

A fourth embodiment of the present invention will now be described.

Figure 12:
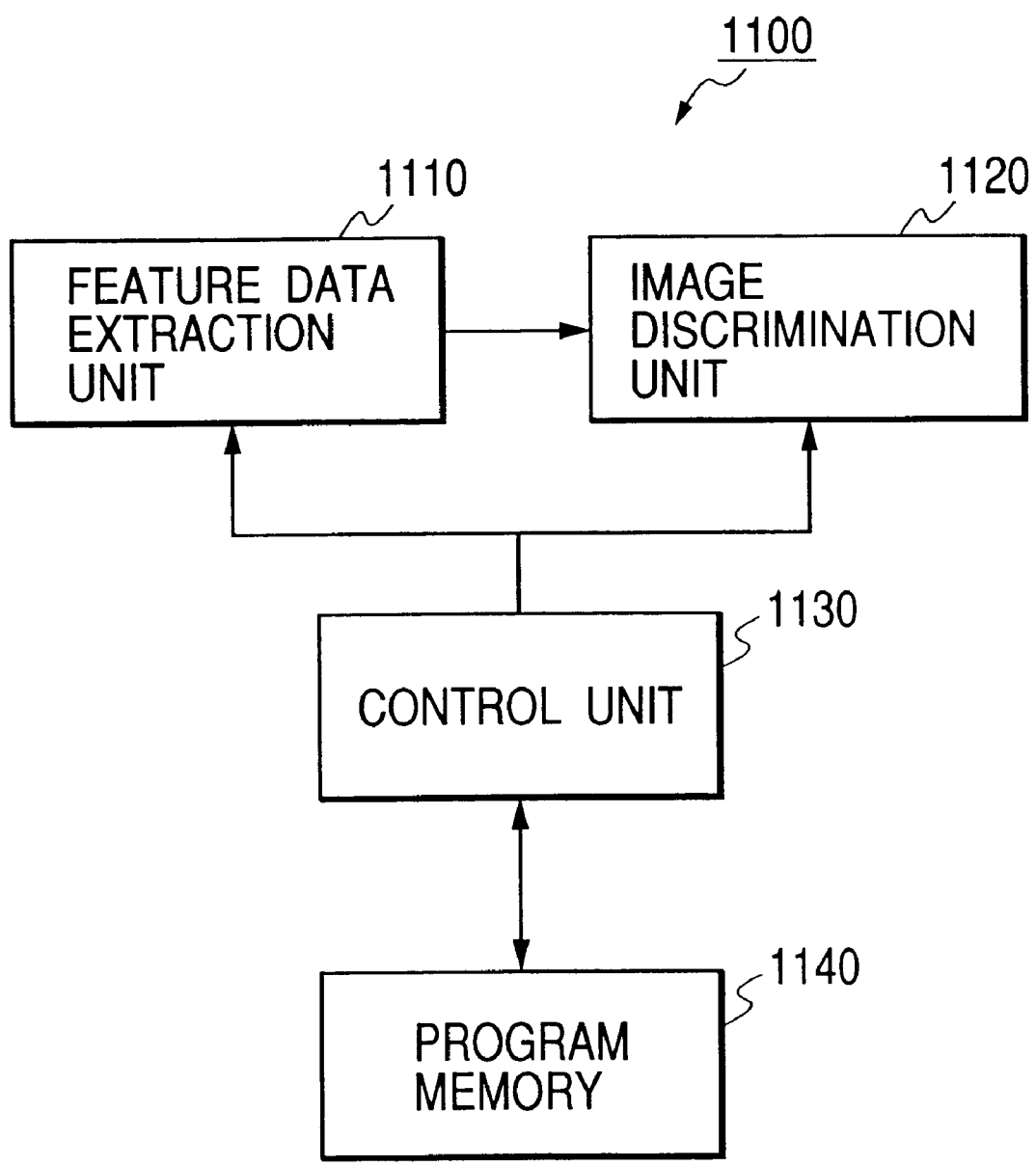
FIG. 12 is a block diagram illustrating the arrangement of an image discrimination apparatus according to a fourth embodiment of the present invention.

The fourth embodiment is applied for an image discrimination apparatus 1100 shown in FIG. 12.

Specifically, as is shown in FIG. 12, the image discrimination apparatus 1100 comprises: a feature data extraction unit 1110; an image discrimination unit 1120, for receiving the data for a feature from the feature data extraction unit 1110; a control unit 1130, for controlling the feature data extraction unit 1110 and the image discrimination unit 1120; and a program memory 1140 that is to be accessed by the control unit 1130.

Figure 13:
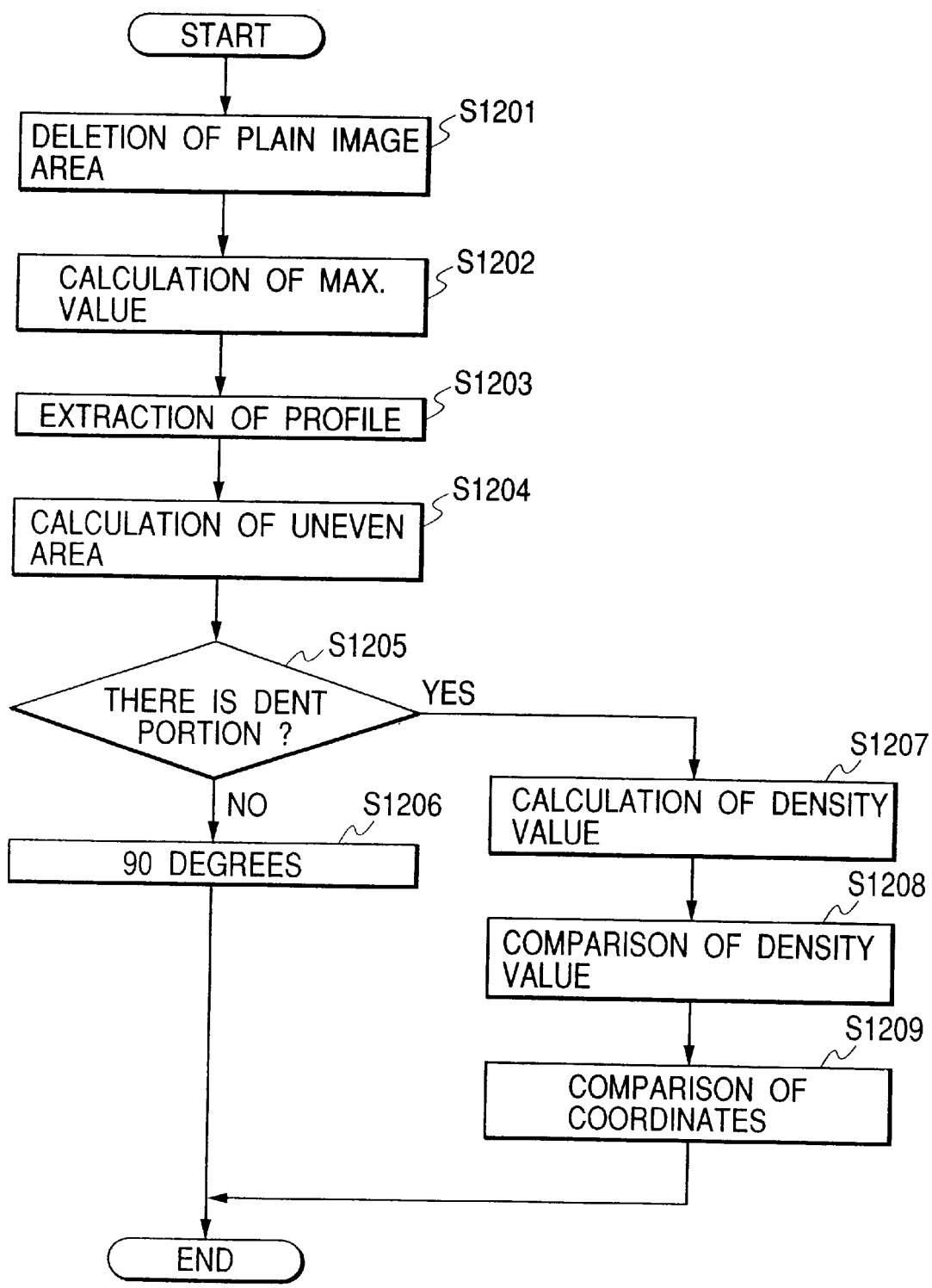
FIG. 13 is a flowchart showing a processing program to be executed by the image discrimination apparatus in FIG. 12.

A processing program as is shown in the flowchart in FIG. 13 is stored in advance in the program memory 1140. When the processing program is read and executed by the control unit 1130, the feature data extraction unit 1110 and the image discrimination unit 1120 perform their operations, which will be described later.

Figure 14:
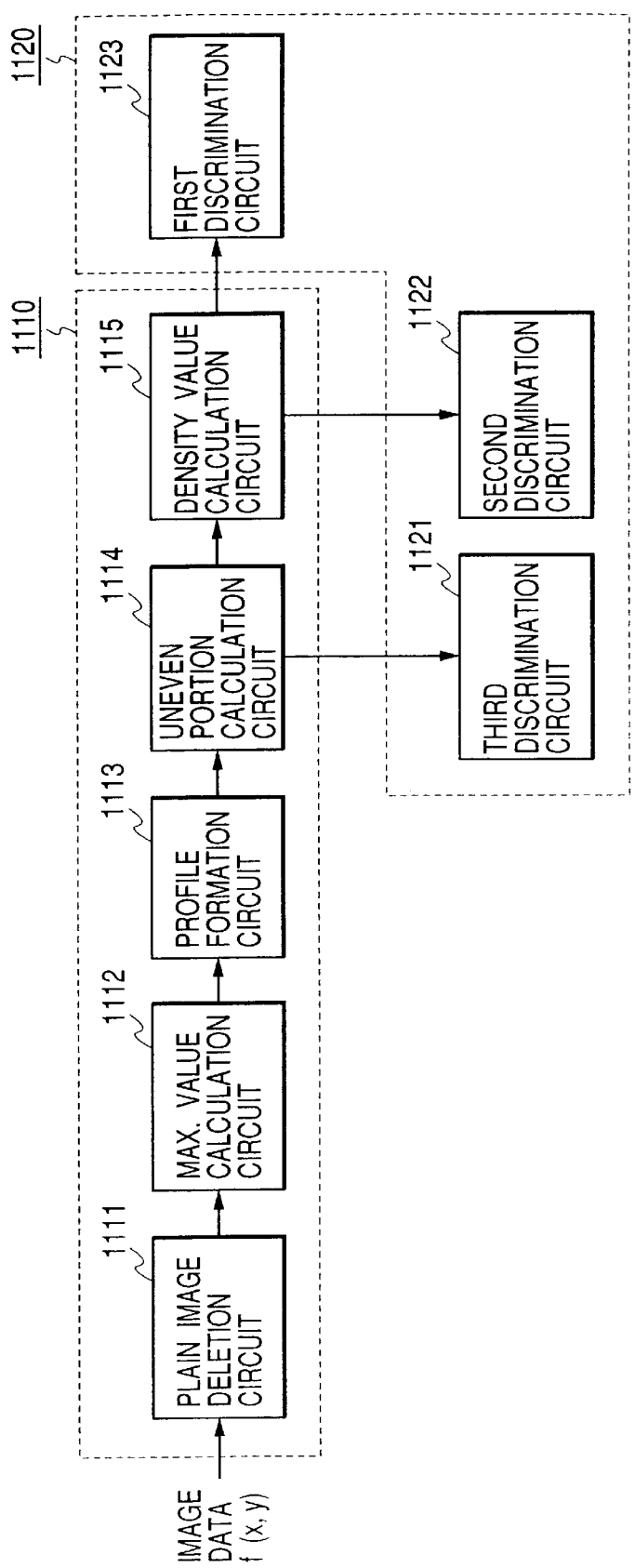
FIG. 14 is a detailed block diagram illustrating the arrangement for a feature data extraction unit and an image discrimination unit in the image discrimination apparatus shown in FIG. 12.
Figure 15:
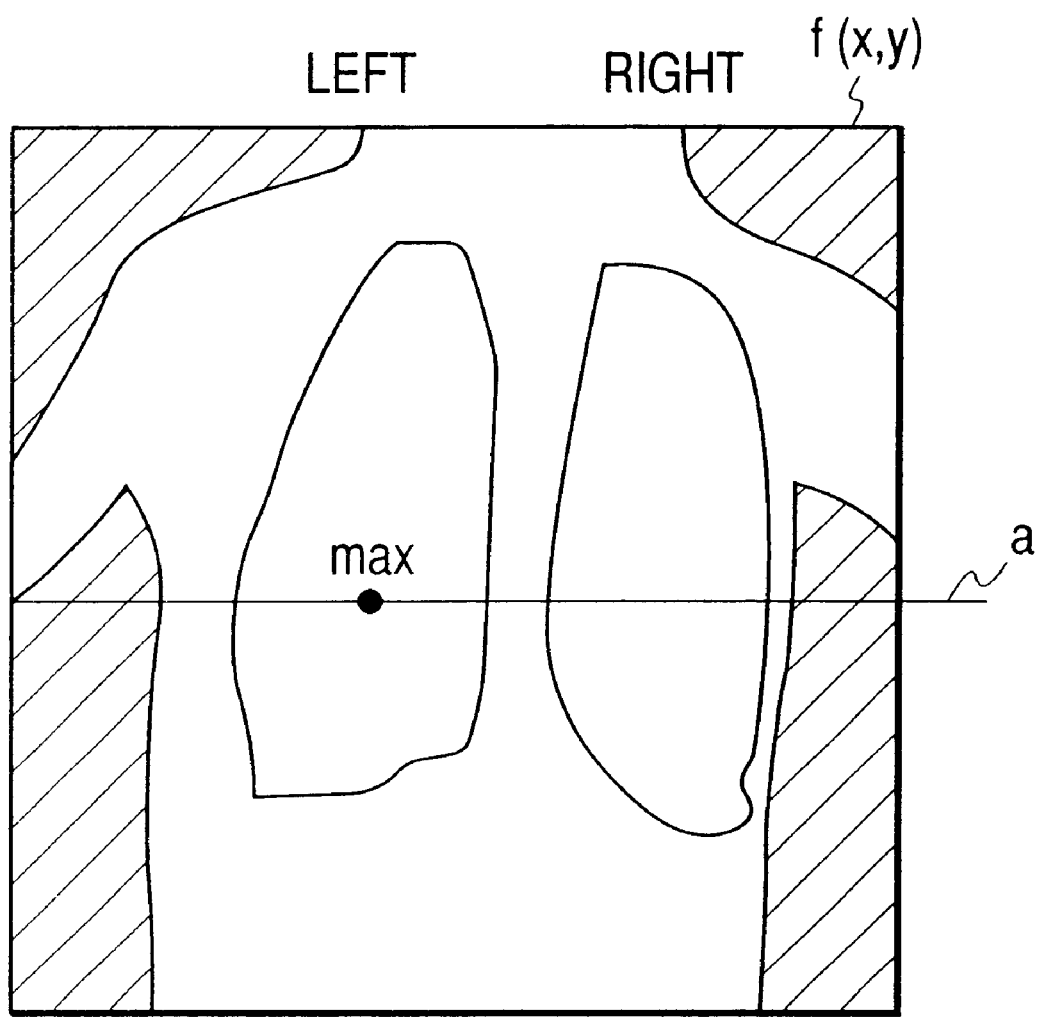
FIG. 15 is a diagram for explaining an example image represented by image data that are input to the image discrimination apparatus in FIG. 12.

As is shown in FIG. 14, the feature data extraction unit 1110 comprises: a plain image deletion circuit 1111 for deleting from input image data (in this embodiment, chest autoradiographic data f(x, y) in FIG. 15) a plain image (a shaded portion in FIG. 15) and a body image that contacts the plain image at a constant interval; a maximum value calculation circuit 1112, for employing the area that has not been deleted by the plain image deletion circuit 1111 to calculate the maximum density value and the coordinates of that value; a profile forming circuit 1113, for producing a profile that passes through the coordinates of the maximum density value obtained by the maximum value calculation circuit 1112; an uneven portion calculation circuit 1114, for calculating an uneven portion using the profile that is formed by the profile forming circuit 1113; and a minimum value calculation circuit 1115, for employing the uneven portion obtained by the uneven portion calculation circuit 1114 to calculate the minimum density value and the coordinates of that value.

The image discrimination unit 1120 comprises: a third discrimination circuit 1121, for identifying the radiographic posture using the uneven portion obtained by the uneven portion calculation circuit 1114; a first discrimination circuit 1123, for identifying a radiographic posture using the maximum density value and the minimum density value obtained by the density value calculation circuit 1115; and a second discrimination circuit 1122, for identifying a radiographic posture using the coordinates for the maximum density value and the minimum density value obtained by the density value calculation circuit 1115.

When the processing program shown in FIG. 13 that is stored in the program memory 1140 is read and executed by the control unit 1130, the thus structured image discrimination apparatus 1100 performs the following procedures.

First, the plain image deletion circuit 1111 receives image data f(x, y) and replaces, with 0 pixels, a plain image in the radiated area and a body image that contacts the plain image at a constant interval (step S1201).

Specifically, image conversion represented by equation (6), $$f1(x, y) = f(x, y) \times \prod_{x1=-d1}^{x1=d1} \prod_{y1=-d2}^{y1=d2} \text{sgn}(x + x1, y + y1) \quad (6)$$

is performed for the input image data f(x,y).

"f1(x, y)" in equation (6) represents image data that are obtained by deleting, from the image data f(x, y), the plain image, and the body image that contacts the plain image at a constant interval.

"sgn(x,y)" is represented by equation (7), sgn(x,y)=0: f(x, y)≧Th1 sgn(x,y)=1: others (7)

wherein Th1 is a constant that is defined through experimentation, and d1 and d2 are constants for determining the interval in order to delete the body image.

The maximum value calculation circuit 1112 calculates the maximum density value max, and its coordinates, for the image data f1(x, y) that are obtained by the plain image deletion circuit 1111 (step S1202).

Next, the profile forming circuit 1113 forms a profile that passes through the coordinates of the maximum density value obtained by the maximum value calculation circuit 1112 and that, for example, is perpendicular to the body (step S1203).

It should be noted that, as is shown in FIG. 15, a profile is to be formed that passes through the maximum value max along a horizontal axis "a".

The profile forming circuit 1113 forms the profiles shown in FIGS. 16A to 16F, for example. In FIG. 16A a standard profile is shown for which the radiographic posture is the front of the lungs. In FIGS. 16B to 16E profiles are shown for individual radiographic postures when, with the chest facing a sensor, the right side of the body is raised while the left side contacts the sensor, and the angle formed between the sensor and the body is gradually changed to 15°, 30°, 45° and 60°. In FIG. 16F a standard profile is shown for which the radiographic posture is the side of the lungs.

The uneven portion calculation circuit 1114 uses the profile that is formed by the profile forming circuit 1113 to calculate an uneven portion (step S1204).

Specifically, the uneven portion calculation circuit 1114 calculates an x portion that is represented by expression (8), (f1(x−d, y1)−f1(x, y1))>0 &&

(f1(x+d, y1)−f1(x, y1))>0 (8).

"y1" in expression (8) represents the y coordinate of the maximum density value that is obtained by the maximum value calculation circuit 1112, and "d" represents a constant that is defined through experimentation, etc.

The uneven portion calculation circuit 1114 regards the area x obtained using equation (8) as a dent portion, and the other areas as a raised portion.

The third discrimination circuit 1112 determines whether the dent portion has been calculated by the uneven portion calculation circuit 1114 (step S1205).

When it is found at step S1205 that no dent portion is present, the third discrimination circuit 1121 ascertains that the radiographic posture is the side of the lungs (step S1206). This is because, as is shown in FIG. 16F, there is no dent portion when the radiographic posture is the side.

After this decision, the processing is terminated.

When it is found at step S1205 that a dent portion is present, the density value calculation circuit 1115 employs the uneven portion obtained by the uneven portion calculation circuit 1114 to calculate a maximum value $a_1$ for the left raised portion and its coordinates, a minimum value b for the dent portion and its coordinates, and a maximum value $a_2$ for the right raised portion and its coordinates (step S1207).

The first discrimination circuit 1123 compares the obtained maximum value $a_1$ for the left raised portion with the minimum value b for the dent portion in order to determine the radiographic posture (step S1208).

Specifically, to determine the radiographic posture a value is used that is obtained by employing equation (9), $$H = \frac{b}{a_1}. \quad (9)$$

In this embodiment, for example, a table in which values H and corresponding radiographic postures are entered is provided in advance, and the table is used to determine the radiographic posture that corresponds to the value H that is actually obtained.

The second discrimination circuit 1123 compares a distance $d_1$, which extends from the coordinates for the maximum value $a_1$, in the left raised portion, obtained by the density value calculation circuit 1115, to the coordinates for the minimum value b in the dent portion, and a distance $d_2$, which extends from the coordinates for the maximum value $a_2$ in the right raised portion to the coordinates for the minimum value b in the dent portion, and determines whether the right side or the left side of the chest is nearer a tubular bulb (a radioactive ray radiation port) (step S1209).

Specifically, when $d_1 < d_2$, the radiographic posture is identified as being one for which the right side of the body is nearer the tubular bulb. When $d_1 > d_2$, the radiographic posture is identified as being one for which the left side of the body is nearer the tubular bulb.

After this decision is made, the processing is terminated.

As is described above, in this embodiment, since the plain image and the body image that contacts the plain image at a constant interval are deleted, the maximum density value in the body image can be accurately and consistently extracted within a short period of time.

Furthermore, since the shape of the profile that passes through the maximum density value max in the body image is employed for the identification of the radiographic posture, the radiographic posture can be accurately identified within a short period of time, without being affected by a change in the radiographic condition.

In addition, since the distance $d_1$, which extends from the coordinates of the maximum value $a_1$ in the left raised portion of the chest to the coordinates of the minimum value b in the dent portion, is compared with the distance $d_2$, which extends from the coordinates of the maximum value $a_2$ in the right raised portion of the chest to the coordinates of the minimum value b in the dent portion, whether the radiographic posture is to the right or to the left can be accurately determined.

Figure 17:
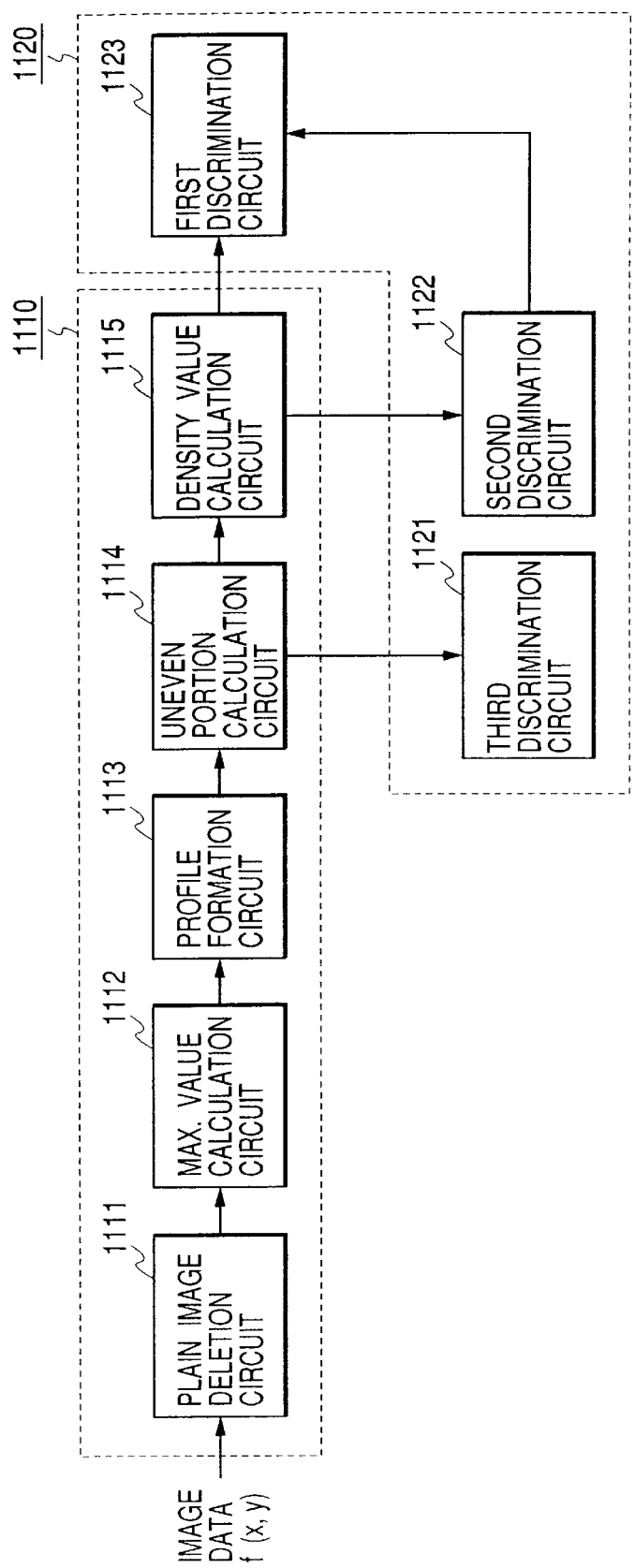
FIG. 17 is a detailed block diagram illustrating the arrangement for an image discrimination unit for an image discrimination apparatus according to a fifth embodiment of the present invention.

In a fifth embodiment, the arrangement of the image discrimination unit 1120 in the image discrimination apparatus 1100 (in FIG. 12) in the fourth embodiment is changed to that shown in FIG. 17.

That is, in the fifth embodiment, the arrangement for supplying to a first discrimination circuit 1123 the result obtained by a second discrimination circuit 1122 differs from that in the fourth embodiment.

Only the portion that differs from that of the fourth embodiment will specifically be described.

First, as is described above, the second discrimination circuit 1122 employs the relationship between the distance $d_1$, which extends from the coordinates for the maximum value $a_1$ in the left raised portion, obtained by a density value calculation circuit 1115, to the coordinates for the minimum value b in the dent portion, and the distance $d_2$, which extends from the coordinates for the maximum value $a_2$ in the right raised portion to the coordinates for the minimum value b in the dent portion, i.e., either the relationship "$d_1 < d_2$" or "$d_1 > d_2$," and determines whether the right or the left side of the chest is nearer the tubular bulb (radioactive ray radiation port).

The second discrimination circuit 1122 transmits the result of the determination to the first discrimination circuit 1123.

When, as the result obtained by the second discrimination circuit 1122, the relationship of the distance $d_1$ and the distance $d_2$ is "$d_1 < d_2$," as is described above, to determine the radiographic posture the first discrimination circuit 1123 uses equation (9).

As for the other relationships, the first discrimination circuit 1123 identifies the radiographic posture using equation (10), $$H = \frac{b}{a_2}. \quad (10)$$

In other words, the maximum value $a_2$ in the right raised portion, which is obtained by the density value calculation circuit 1115, is compared with the minimum value b in the dent portion, and the radiographic posture is identified.

As is described above, in this embodiment, when $d_1 < d_2$ (when the radiographic posture is one where the right side is nearer the tubular bulb), the radiographic posture is identified using equation (9), which employs the maximum value $a_1$ in the left raised portion. For the other case (when the radiographic posture is one where the left side is nearer the tubular bulb), the radiographic posture is identified using equation (10), which employs the maximum value $a_2$ in the right raised portion. In other words, since the maximum value in the raised portion of the lung image that is nearer the tubular bulb, which fluctuates less than the maximum value in the portion that is farther from the tubular bulb, is employed for the discrimination equation, the process for the identification of the radiographic posture is more stable.

Figure 18:
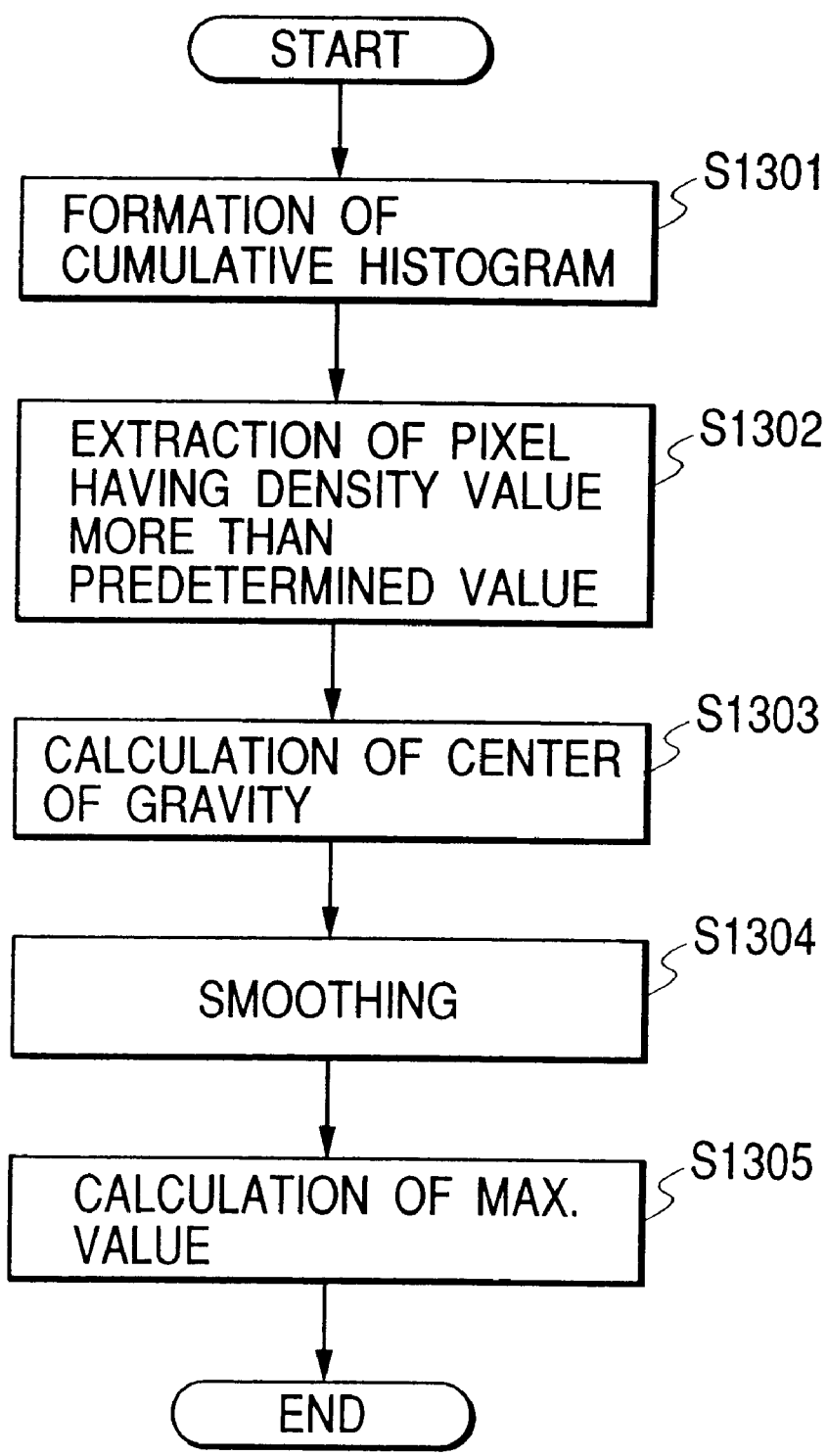
FIG. 18 is a flowchart for explaining a processing program to be executed by a maximum value calculation circuit, in a feature data extraction unit, for an image discrimination apparatus according to a sixth embodiment of the present invention.

In a sixth embodiment, a processing program shown in the flowchart in FIG. 18 is employed that enables the maximum value calculation circuit 1112 in FIG. 14 to obtain the maximum density value, and its coordinates, from an image that is acquired by deleting from an image a plain image, and a body image that contacts the plain image at a constant interval.

The processing program in FIG. 18 is stored in advance in a program memory 1140, and when it is read and executed by a control unit 1130, the maximum value calculation circuit 1112 initiates the following operation.

First, a cumulative histogram is formed for an image obtained by a plain image deletion circuit 1111 (an image from which a plain image, and an image that contacts the plain image at a constant interval have been extracted) (step S1301).

Then, a pixel that has a density value that is equal to or greater than the constant density value Th3, which is defined through experimentation, is extracted from the cumulative histogram formed at step S1301 (step S1302).

The barycenter of the pixel extracted at step S1302 is calculated (step S1303), and the profile that passes through the coordinates of the barycenter is smoothed (step S1304). Employed for the smoothing, for example, is the density average, the middle value in a specific image area, or grayscale morphology.

The maximum density value and the coordinates on the profile that is smoothed at step S1304 are defined as the maximum density value and the coordinates that are to be output to the profile forming circuit 1113 at the following stage (step S1305).

As is described above, in the sixth embodiment, by using the cumulative histogram, the barycenter that has a density value that is equal to or greater than a constant density value (Th3) is defined as the maximum density value, and it and its coordinates are employed by the profile forming circuit 1113. As a result, noise can be removed, and stable data can be obtained for a feature.

In addition, since the profile that passes through the obtained barycenter is smoothed and the coordinates of the maximum density value and the maximum density value are re-determined, the data for a feature can be extracted accurately and consistently, without being affected by noise.

The objectives of the present invention are achieved as follows: a memory medium on which is stored software program code for implementing the functions of a host computer or a terminal in the fourth to the sixth embodiments is supplied to a system or to an apparatus, and the computer (or a CPU or an MPU) in the system or the apparatus reads the program code from the memory medium.

In this case, the program code read from the memory medium accomplishes the functions of the above described embodiments, and the memory medium on which such program code is recorded constitutes the present invention.

A memory medium for supplying such program code can be, for example, a ROM, a floppy disk, a hard disk, an optical disk, a magneto optical disk, a CD-ROM, a CD-R, a magnetic tape or a nonvolatile memory card.

In addition, the scope of the present invention includes not only a case where the functions in the fourth to the sixth embodiments can be performed when program code is read and executed by the computer, but also a case where, according to an instruction in the program code, an OS running on the computer, etc., performs one part, or all, of the actual processing to accomplish the functions included in the above embodiments.

Furthermore, in order to implement the functions included in the fourth to the sixth embodiments, the present invention includes a case where program code, read from a memory medium, is written in a memory that is mounted on a function expansion board inserted into a computer, or a function expansion unit connected to a computer, and in consonance with a program code instruction, a CPU mounted on the function expansion board, or on the function expansion unit, performs one part, or all, of the actual processing.

Figure 19:
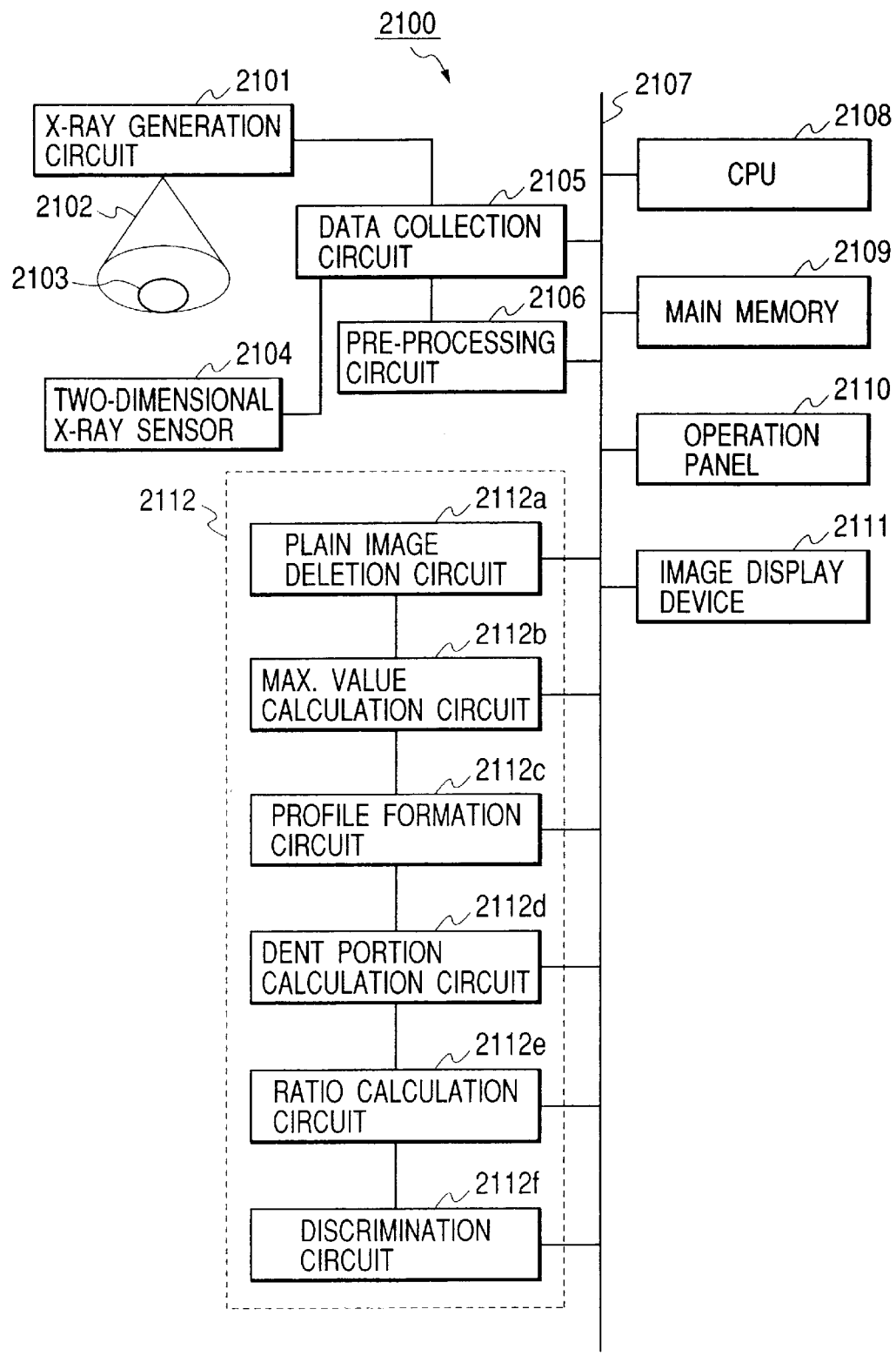
FIG. 19 is a block diagram illustrating the arrangement of an image processing apparatus according to a seventh embodiment of the present invention.

In a seventh embodiment, the present invention is applied for an image processing apparatus 2100 shown in FIG. 19.

As is shown in FIG. 19, the image processing apparatus 2100 comprises a data collection circuit 2105, a pre-processing circuit 2106, an image discrimination circuit 2112, a CPU 2108, a main memory 2109, an operation panel 2110, and an image display device 2111. These sections perform the mutual exchange of data via a CPU bus 2107.

The image processing apparatus 2100 also comprises an x-ray generation circuit 2101 and a two-dimensional x-ray sensor 2104, both of which are connected to the data collection circuit 2105. An x-ray beam 2102 that is radiated by the x-ray generation circuit 2101 passes through a subject to be examined 2103 and impinges on the two-dimensional x-ray sensor 2104.

In the thus-arranged image processing apparatus 2100, a processing program and various data that are required for the several processes performed by the CPU 2108 are stored in the main memory 2109. The main memory 2109 also includes a work memory for the CPU 2108.

The CPU 2108 reads and executes the processing program stored in the main memory 2109, and, in consonance with the manipulation of switches at the operation panel 2110, provides control for all the operations performed by the apparatus. Therefore, the following operation is initiated by the image processing apparatus 2100.

First, when a user enters at the operation panel 2110 an instruction to begin the radiographic process, the x-ray generation circuit 2101 emits an x-ray beam 2102 to irradiate the subject 2103.

The x-ray beam 2102 emitted by the x-ray generation circuit 2101 passes through the subject 2103, while being attenuated, and impinges on the two-dimensional x-ray sensor 2104.

The two-dimensional x-ray sensor 2104 converts the x-ray beam 2102 that was emitted by the x-ray generation circuit 2101 and that passed through the subject 2102 to provide an electric signal that is output as x-ray image data for the subject 2103.

It should be noted that in this case the obtained x-ray image is, for example, a front or a side image of the chest.

The data collection circuit 2105 digitizes the x-ray image signal received from the two-dimensional x-ray sensor 2104, and transmits the digital signal as x-ray image data to the pre-processing circuit 2106.

For the x-ray image data transmitted by the data collection circuit 2105, the pre-processing circuit 2106 performs such pre-processing as offset compensation or gain compensation.

The x-ray image data for which the pre-processing has been performed by the pre-processing circuit 2106 are transmitted across the CPU bus 2107 and are stored in the main memory 2109 by the CPU 2108, and are also supplied to the image discrimination circuit 2112.

The image discrimination circuit 2112 identifies the radiographic posture of the subject 2103 from the x-ray image data that are received via the CPU bus 2107. As is shown in FIG. 19, the image discrimination circuit 2112 includes: a plain image deletion circuit 2112a, for deleting, from the irradiated portion of the x-ray image, data that are received via the CPU bus 2107, a plain image and a body image that contacts the plain image at a constant interval; a maximum value calculation circuit 2112b, for, except for the image portions that are deleted by the plain image deletion circuit 2112a, calculating the maximum density value and its coordinates in the image portion; a profile forming circuit 2112c, for forming a profile that passes through the coordinates of the maximum density value that is obtained by the maximum value calculation circuit 2112b ; a dent portion calculation circuit 2112d, for calculating a dent portion using the profile that is formed by the profile forming circuit 2112c; a ratio calculation circuit 2112e, for calculating the ratio of the dent portion obtained by the dent portion calculation circuit 2112d to the profile that is formed by the profile forming circuit 2112c; and a discrimination circuit 2112f, for employing the ratio acquired by the ratio calculation circuit 2112e to use the x-ray image data to identify the radiographic posture of the subject 2103. These sections are connected to the CPU bus 2107.

Figure 20:
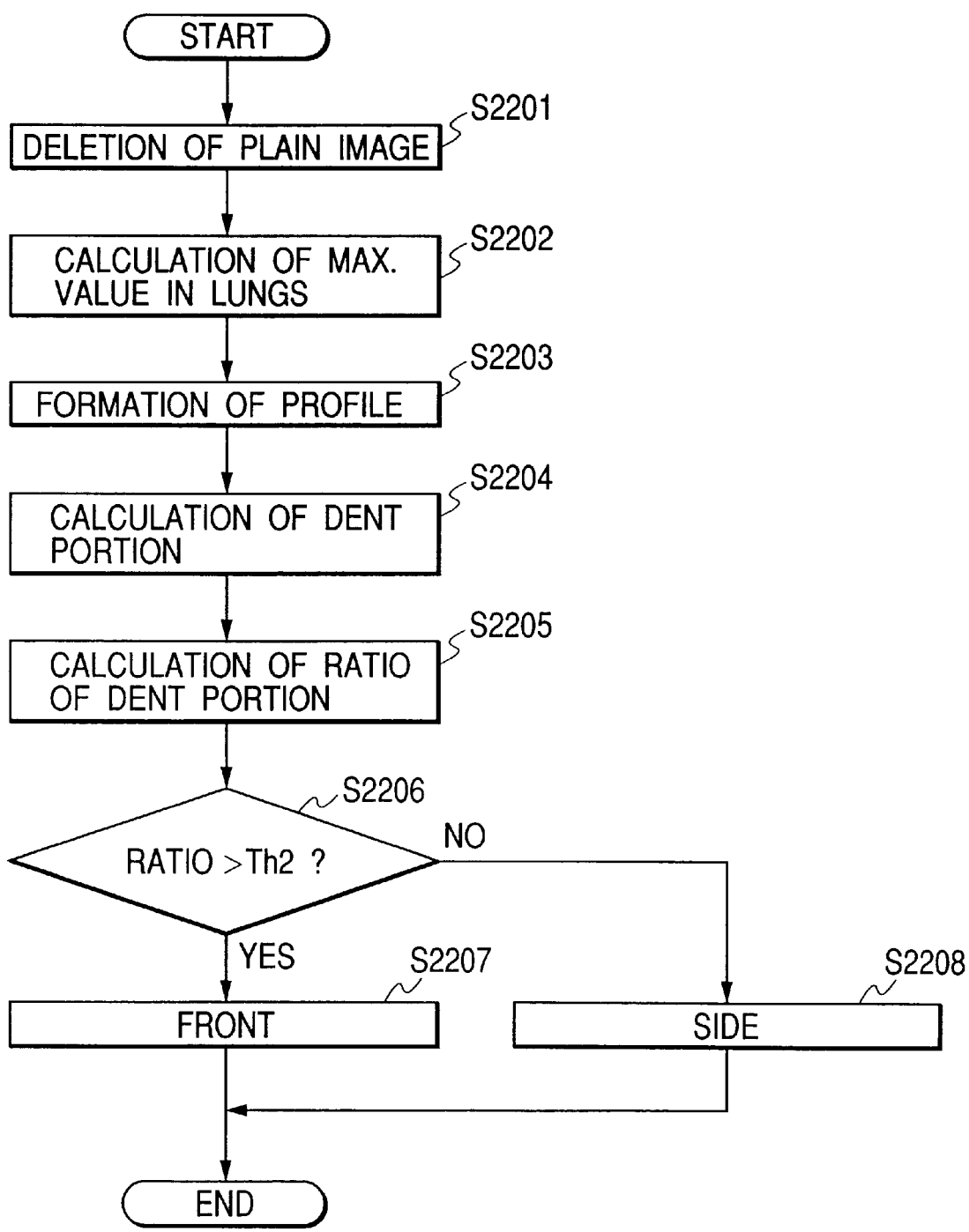
FIG. 20 is a flowchart for explaining the operation performed by the image processing apparatus in FIG. 19.

The above described arrangement of the image discrimination circuit 2112 is the most important feature of the image processing apparatus 2100. The processing performed by the image discrimination circuit 2112 will specifically be explained while referring to the flowchart in FIG. 20.

First, under the control of the CPU 2108, the plain image deletion circuit 2112a receives across the CPU bus 2107 x-ray image data that have been pre-processed by the pre-processing circuit 2106, and replaces, with data having a pixel value of "0", a plain image in the irradiated portion of the image data and a body image that contacts the plain image at a constant interval (step S201).

Figure 21:
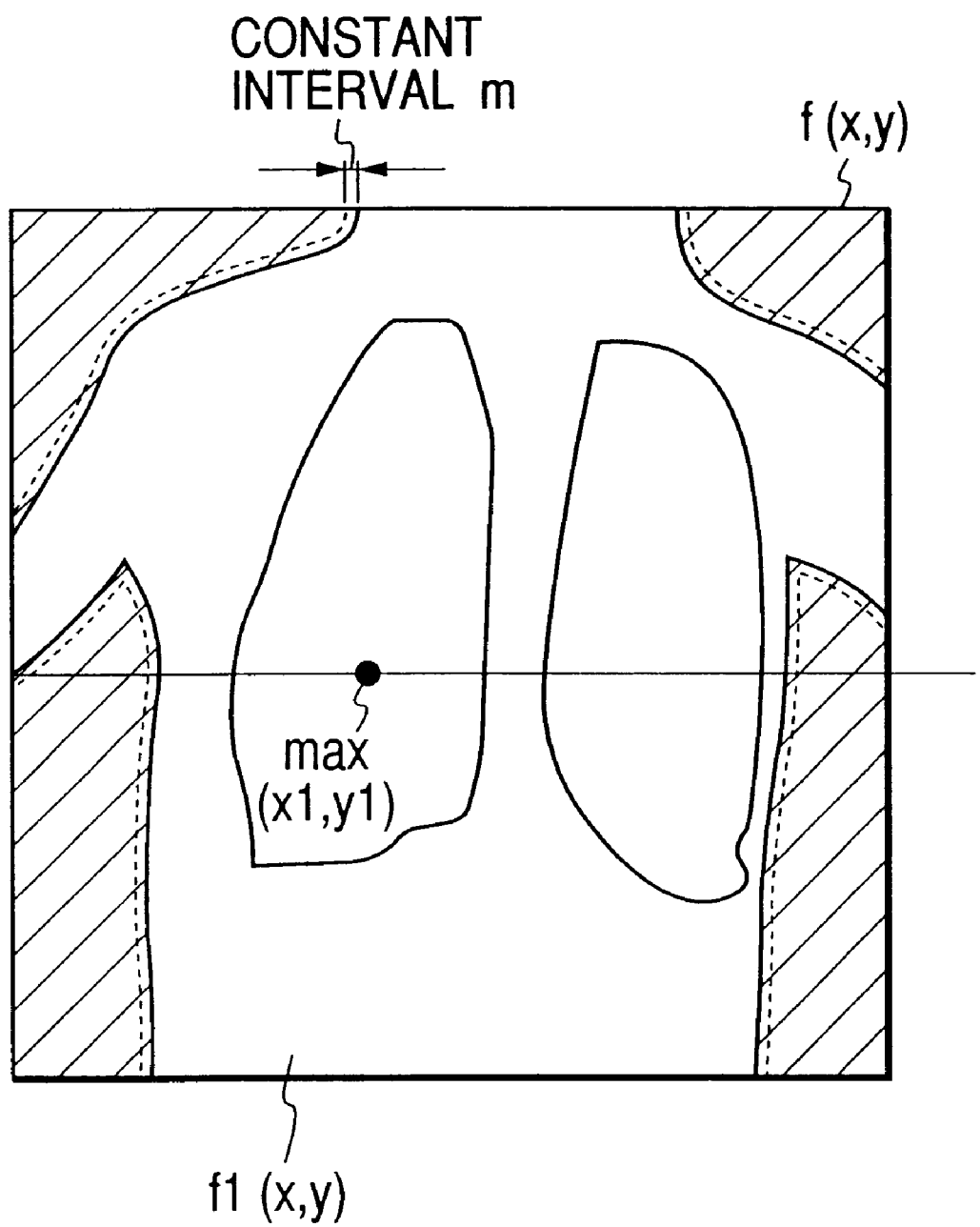
FIG. 21 is a diagram for explaining the processing performed by a plain image deletion circuit for the image processing apparatus in FIG. 19.

Specifically, if an image in the irradiated portion of the x-ray image data (the radiographic image portion for which so-called "diaphragmatic radiation," by which only a required portion is irradiated with an x-ray beam, is performed in order to prevent undesirable scattering into other portions and contrast deterioration) is image f(x, y), shown in FIG. 21, the pixel values in the plain image portion of the image f(x, y) and in the body image portion (shaded portion) that contacts the plain image at a constant interval m are replaced with "0s" (image conversion).

Image f1(x, y), in a portion other than that containing a "0" pixel, is represented by equation (11), $$f1(x, y) = f(x, y) \times \prod_{x1=-d1}^{x1=d1} \prod_{y1=-d2}^{y1=d2} \text{sgn}(x + x1, y + y1). \quad (11)$$

When constant Th1, which is obtained through experimentation, is employed, "sgn(x, y) in equation (11) is represented by condition equation (12), sgn(x,y)=0: when f(x,y)≧Th1 sgn(x,y)=1: in other cases  (12).

"d1" and "d2" represent constants for determining the specific interval m for deleting the body image.

Therefore, as a result of the image conversion using equation (11), the plain image deletion circuit 2112a obtains image f1(x, y) after the deletion of the plain image and the body image (shaded portion) that contacts the plain image at the constant interval m.

Following this, the maximum value calculation circuit 2112b calculates the maximum density value max and its coordinates (x1, y1) for the image f1(x, y) obtained by the plain image deletion circuit 2112a (step S2202).

For the image f1(x, y) obtained by the plain image deletion circuit 2112a, the profile forming circuit 2112c forms the profile shown in FIG. 21 that passes through the coordinates (x1, y1) of the maximum image density value max, which is obtained by the maximum value calculation circuit 2112b, and is vertical or horizontal relative to the body (horizontal in this embodiment) (step S2203).

Figure 22A:
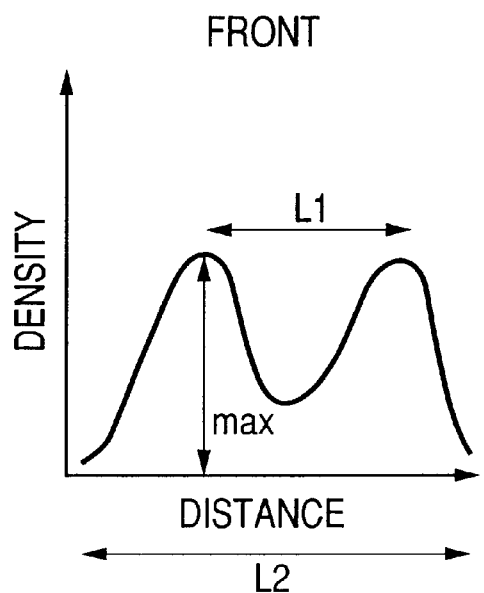
FIGS. 22A and 22B are graphs for explaining example profiles prepared by a profile preparation circuit for the image processing apparatus in FIG. 19.
Figure 22B:
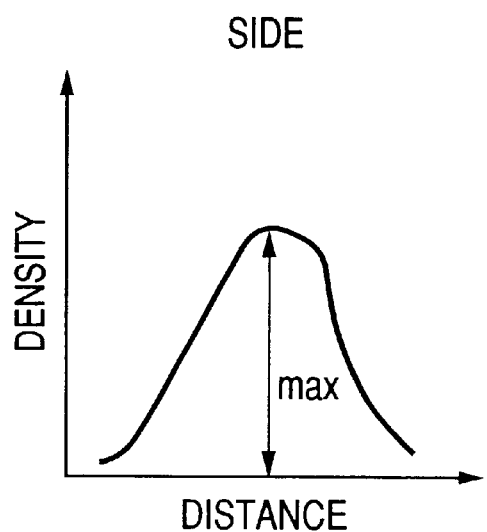

As a result, the profiles shown in FIGS. 22A and 22B are formed by the profile forming circuit 2112c. In FIG. 22A is shown the profile for which the front of the lungs is the graphic posture, and in FIG. 22B is shown the profile for which the side of the lungs is the radiographic posture.

Then, the dent portion calculation circuit 2112d calculates a dent portion for the profile that is formed by the profile forming circuit 2112c (step S2204).

Specifically, an "x" portion is calculated that satisfies expression (13), (f1(x−d, y1)−f1(x, y1))>0 &&

(f1(x+d, y1)−f1(x, y1))>0  (13).

"y1" in expression (13) represents the y coordinate for the maximum image density value obtained by the maximum value calculation circuit 2112b, and "d" represents a constant acquired through experimentation.

The thus obtained "x" portion is defined as the dent portion.

Next, the ratio calculation circuit 2112e employs the following equation (14) to calculate a ratio Ratio of the dent portion obtained by the dent portion calculation circuit 2112d to the profile (step S2205):

Ratio=L1/L2  (14).

"L1" in equation (14) represents the length of the dent portion, and "L2" represents the length of the entire profile.

The discrimination circuit 2112f compares the ratio Ratio obtained by the ratio calculation circuit 2112e with the constant Th2 obtained through experimentation (step S2206). When the ratio Ratio is equal to or greater than the constant Th2, it is ascertained that the radiographic posture is the "front" (step S2207). When the ratio Ratio is smaller than the constant Th2, it is ascertained that the radiographic posture is the "side" (step S2208).

The result that is thus obtained by the image discrimination circuit 2112 is supplied to the CPU 2108 across the CPU bus 2107.

Based on the results provided by the image discrimination circuit 2112, the CPU 2108 performs predetermined image processing for the x-ray data stored in the main memory 2109.

The image display device 2111 provides a display in consonance with the x-ray image data that have been processed by the CPU 2108.

As is described above, according to this embodiment, the plain image and the body image that contacts the plain image at a constant interval are deleted from the irradiated portion of the x-ray image data obtained by the x-ray exposure, and the coordinates (x1, y1) of the maximum density value max are calculated for the resultant image f(x, y). Then, a profile that passes through the coordinates (x1, y1) is formed, and the shape of the profile is employed to identify the radiographic posture, such as the "front" or the "side".

With this arrangement, the radiographic posture can be accurately determined in a short period of time, without being affected by changes in the radiographic condition. In addition, since a dent portion in a profile that is little affected by changes in the radiographic condition is employed as the reference for the identification of the radiographic posture, consistent results can always be obtained.

In an eighth embodiment, the image processing apparatus 2100 in FIG. 19 employs condition expression (15), (f1(x−d, y1)−f1(x, y1))>0 &&

(f1(x+d, y1)−f1(x, y1))>0 && f1(x)<Th3  (15), instead of condition expression (13), which was employed by the dent portion calculation circuit 2112d.

"Th3" in expression (15) can be represented by equation (16),

Th3=0.7Xmax  (16).

That is, "Th3" represents the constant ratio of the maximum density value max of the profile, and in this embodiment is 70%.

Figure 23:
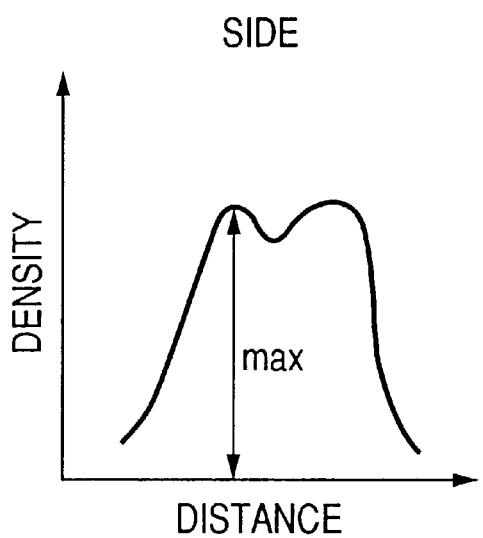
FIG. 23 is a graph for explaining an example wherein a dent exists in the profile in FIGS. 22A and 22B even when the posture for radiography is the side.

With this arrangement, even when, as is shown in FIG. 23, a dent portion is present in the profile that is formed by the profile forming circuit 2112c in an x-ray image for which the radiographic posture is the "side," the radiographic posture can be precisely identified, and an erroneous identification will not be made.

The objectives of the present invention are achieved as follows: a memory medium on which is stored software program code for implementing the functions of a host computer or a terminal in the seventh and the eighth embodiments is supplied to a system or to an apparatus, and the computer (or a CPU or an MPU) in the system or the apparatus reads the program code from the memory medium.

In this case, the program code read from the memory medium accomplishes the functions of the above described embodiments, and the memory medium on which such program code is recorded constitutes the present invention.

A memory medium for supplying such program code can be, for example, a ROM, a floppy disk, a hard disk, an optical disk, a magneto optical disk, a CD-ROM, a CD-R, a magnetic tape or a nonvolatile memory card.

In addition, the scope of the present invention includes not only a case where the functions in the seventh and the eighth embodiments can be performed when program code is read and executed by the computer, but also a case where, according to an instruction in the program code, an OS running on the computer, etc., performs one part, or all, of the actual processing to accomplish the functions included in the above embodiments.

Furthermore, in order to implement the functions included in the seventh and the eighth embodiments, the present invention includes a case where program code, read from a memory medium, is written in a memory that is mounted on a function expansion board inserted into a computer, or a function expansion unit connected to a computer, and in consonance with a program code instruction, a CPU mounted on the function expansion board, or on the function expansion unit, performs one part, or all, of the actual processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image discrimination apparatus, which extracts the data for a feature from a radiograph that is produced when a subject is irradiated with radioactive rays by a radioactive device and which employs the obtained data for the feature to identify the category of said subject in said radiograph, comprising:
   (a) a plain image detecting circuit configured to receive a radiographic signal and adapted to detect a plain image area indicated by said radiographic signal and to extract an area other than said plain image area that is detected and an area, which is in contact with said plain image area, having a predetermined width:
   (b) a maximum density value calculation circuit adapted to calculate the maximum density value for a one of a plurality of pixels that constitute said area, and the coordinates of the location of said one pixel in said radiograph;
   (c) a feature data calculation circuit adapted to calculate the data for the feature of said radiograph by employing said maximum density value for said pixel and said coordinates for said pixel in said radiograph, both of which are obtained by said maximum density value calculation circuit; and
   (d) a discrimination circuit configured to receive said data for said feature obtained by said feature data calculation circuit and adapted to identify the category of said subject in said radiograph.

2. An image discrimination appatatus according to claim 1, wherein said feature data calculation circuit comprises:
   a profile forming circuit adapted to form a profile of density values for said pixels that are located along a line, passing through said coordinates in said radiograph, on which is positioned said pixel that has the maximum density value that is obtained by said maximum density value calculation circuit; and
   a dent portion detection circuit adapted to detect a portion wherein changes in said density values of said pixels in said profile formed by said profile forming circuit are concave in shape, and
   wherein said feature data calculation circuit is arranged to calculate, as data for a feature, the maximum density value of a pixel in said portion wherein changes in said density values of said pixels are concave in shape, and coordinates in said radiograph whereat said pixel having said maximum density value is located.

3. An image discrimination apparatus according to claim 1, wherein said maximum density value calculation circuit is arranged to define, as said coordinates in said radiograph whereat said pixel having said maximum density value is located, the barycenter at coordinates in said radiograph whereat a pixel having a predetermined or higher density value is located, and to define the density value for said pixel at said coordinates as the maximum density value for said pixel.

4. An image discrimination apparatus according to claim 1, wherein said feature data calculation circuit further comprises:
   (a) a profile forming circuit adapted to form a profile consisting of density values for pixels that are located along a line passing through said coordinates in said radiograph at which is located said pixel having the maximum density value obtained by said maximum density value calculation circuit; and
   (b) a pixel density value change calculation circuit adapted to divide said profile formed by said profile forming circuit in each predetermined interval along a distance axis, and to calculate density values of pixels at division points and changes in said density values of said pixels along said distance axis.

5. An image discrimination apparatus according to claim 4, wherein said pixel density value change calculation circuit is so arranged as to detect a plain image in said profile formed by said profile forming circuit; to normalize an area other than said plain image and an area that contacts said plain image at a constant interval; to divide a profile in the normalized area for each predetermined interval along said distance axis; and to calculate said density values for said pixels at division points and changes in said density values for said pixels along said axis.

6. An image discrimination apparatus according to claim 1, wherein said radiograph indicated by said radiographic signal is an image for which a smoothing process is performed.

7. An image discrimination apparatus according to claim 1, wherein said discrimination circuit is arranged so as to employ said feature data obtained by said feature data calculation circuit to identify the radiographic posture of said subject in said radiograph.

8. An image discrimination apparatus according to claim 1, further comprising a memory medium that is readable by a computer in which is stored a program for permitting said area extraction circuit, said maximum density value calculation circuit, said feature data calculation circuit and said discrimination circuit to perform processing,
   wherein said image discrimination apparatus is arranged so that the processing is controlled by said computer that is operated by said program stored in said memory medium.

9. An image discrimination apparatus according to claim 1, wherein said feature data calculation circuit comprises:

(a) a profile forming circuit adapted to form a profile of density values for pixels that are located along a line passing through said coordinates in said radiograph at which said pixel is located that has the maximum density value obtained by said maximum density value calculation circuit; and (b) a dent portion detection circuit adapted to detect a portion wherein changes in said density values of said pixels in said profile formed by said profile forming circuit are concave in shape, and wherein said discrimination circuit has a first discrimination circuit adapted to identify the radiographic posture or said subject in said radiograph by using the result of the detection performed by said dent portion detection circuit.

10. An image discrimination apparatus according to claim 13, wherein said discrimination circuit further comprises:

(a) a minimum density value calculation circuit adapted to employ said result obtained by said first discrimination circuit to calculate the minimum density value of a pixel, in said portion detected by said dent portion detection circuit wherein said changes in said density values of said pixels are concave in shape, and of the coordinates in said radiograph whereat said pixel having said minimum density value is located;

(b) a density value companson circuit adapted to compare said minimum density value, obtained by said minimum density value calculation circuit, with a density value for a pixel in said profile formed by said density values for said pixels that are located along said line passing through the coordinates located at a predetermined distance from said coordinates in said radiograph whereat said pixel having said minimum density value is located; and (c) a second discrimination circuit adapted to identify the radiographic posture of said subject in said radiograph by using the results obtained by said density value comparison circuit.

11. An image discrimination method, whereby the data for a feature are extracted from a radiograph that is produced when a subject is irradiated with radioactive rays by a radioactive device and whereby the obtained data for the feature are employed to identify the category of said subject in said radiograph, comprising:

(a) an area extraction step comprising detecting a plain image area indicated by a radiographic signal, and extracting an area other than said plain image area that is detected and an area, which is in contact with said plain image area, having a predetermined width;

(b) a maximum density value calculation step comprising calculating the maximum density value for one pixel of those pixels that constitute said area, and the coordinates of the location of said pixel in said radiograph;

(c) a feature data calculation step comprising calculating the data for the feature of said radiograph by employing said maximum density value for said pixel and said coordinates for said pixel in said radiograph, both of which are obtained at said maximum density value calculation step; and (d) a discrimination step comprising employing said data for said feature obtained at said feature data calculation step to identify the category of said subject in said radiograph.

12. An image discrimination apparatus, which identifies the posture of a subject in a radiograph produced when said subject is radiated with radioactive rays by a radioactive device, comprising:

a comparison circuit configured to receive a radiographic signal, and adapted to detect a density value for a pixel that constitutes a first area, which corresponds to a first radiograph portion indicated by said radiographic signal, and a density value for a pixel that constitutes a second area, which corresponds to a second portion, and to compare the two density values; and a discrimination circuit adapted to employ said radiograph to determine the radiographic posture of a subject, wherein said radiograph indicated by said radiographic signal is an image of the chest of a patient, and wherein said first portion is the lungs of said patient and said second portion is the mediastinum.

13. An image discrimination apparatus according to claim 12, wherein said comparison circuit is adapted to detect the maximum density value of a pixel constituting said first area that corresponds to said first portion, and the minimum density value of a pixel constituting said second area that correspond to said second portion and is further adapted to compare said maximum density value with said minimum density value.

14. An image discrimination apparatus according to claim 12, wherein said radiograph indicated by said radiographic signal is an image for which a smoothing process is performed.

15. An image discrimination apparatus according to claim 12, further comprising a memory medium that is readable by a computer in which is stored a program for permitting said comparison circuit and said discrimination circuit to perform processing, wherein said image discrimination apparatus is arranged so that the processing is controlled by said computer that is operated by said program stored in said memory medium.

16. An image discrimination apparatus, which identities the posture of a subject in a radiograph obtained by a radioactive device irradiating a subject with radioactive rays, comprising:

(a) a detection circuit configured to receive a radiographic signal, and adapted to detect a density value, which serves as a feature, for one pixel of a plurality of pixels that constitute a first area corresponding to a first portion of a radiograph that is indicated by said radiographic signal, and a density value, which serves as a feature, for one pixel of a plurality of pixels that constitute a second area corresponding to a second portion, and to determine the distance between the two density values; and (b) a discrimination circuit adapted to employ the results obtained by said detection circuit to identify the radiographic posture of a subject, wherein said radiograph indicated by said radiographic signal is an image of the chest of a patient, and wherein said first portion is the lungs of said patient and said second portion is the mediastinum.

17. An image discrimination apparatus according to claim 16, wherein said detection circuit is adapted to detect the coordinates for the middle point in said first area corresponding to said first portion, and the coordinates for the middle point in said second area corresponding to said second portion, and is further adapted to calculate the distance between the coordinates of said first area and said second area.

18. An image discrimination apparatus according to claim 16, wherein said radiograph indicated by said radiographic signal is an image for which a smoothing process is performed.

19. An image discrimination apparatus according to claim 16, further comprising a memory medium that is readable by a computer in which is stored a program for permitting said detection circuit and said discrimination circuit to perform processing, wherein said image discrimination apparatus is arranged so that the processing is controlled by said computer that is operated by said program stored in said memory medium.

20. An image discrimination apparatus, which detects the posture of a subject in an radiograph that is obtained by a radioactive device radiating said subject with radioactive rays, comprising:

(a) a maximum density value coordinate detection circuit configured to receive a radiograph signal and adapted to detect the coordinates for one pixel, of a plurality of pixels that constitute a first area corresponding to a first portion of a radiograph that is indicated by said radiographic signal, that has the maximum density value;

(b) a profile forming circuit adapted to form a profile of density values for pixels that are located along a line passing through said coordinates in said radiograph at which said pixel is located that has the maximum density value obtained by said maximum density value coordinate calculation circuit; and (c) a discrimination circuit adapted to detect a portion wherein said changes in said density values of said pixels are concave in shape and a portion where said changes are convex in shape, to obtain, as data for a feature, a density value which serves as a feature for a pixel in said portion wherein said changes in said density values of said pixels are concave in shape and coordinates on said radiograph where said pixel having said density value as said feature is located, and a density value which serves as a feature for a pixel in a portion where said changes are convex in shape and coordinates on said radiograph where said pixel having said density value as said feature is located, and to employ said data for the feature to identify the radiographic posture of said subject in said radiograph, wherein said radiograph indicated by said radiographic signal is an image of the chest of a patient, and wherein said first portion is the lungs of said a patient and said second portion is the mediastinum.

21. An image discrimination apparatus according to claim 20 wherein said maximum density value coordinate detection circuit comprises:

an area extraction circuit configured to receive a radiographic signal, and adapted to detect a plain image area indicated by said radiographic signal, and to extract an area other than said plain image area that is detected and an area having a predetermined width that contacts said plain image area; and wherein said maximum density valne coordinate detection circuit is arranged so as to detect the coordinates in said radiograph at which is located a pixel, of a plurality of pixels that constitute said first area that corresponds to said first position in said area that is extracted by said area extraction circuit, that has the maximum density value.

22. An image discrimination apparatus according to claim 20, wherein said discrimination circuit comprises:

a comparison circuit adapted to detect, as data for a feature, the minimum density value of a pixel in said detected portion wherein said changes in said density values of said pixels are concave in shape, the coordinates in said radiogaph at which said pixel having said minimum density value is located, the maximum density value of a pixel in said detected portion wherein said changes in said density values of said pixels are convex in shape, and the coordinates in said radiograph at which said pixel having said minimum density value is located, and to compare said maximum density value for said pixel in said detected portion wherein said changes in said density values for said pixels are convex in shape with said minimum density value for said pixel in said detected portion wherein said changes in said density values for said pixels are concave in shape; and wherein said discrimination circuit employs the result obtained by said comparison circuit to identify the radiographic posture of said subject in said radiograph.

23. An image discrimination apparatus according to claim 20, wherein said discrimination circuit comprises:

a comparison circuit adapted to detect, as data for a feature, the coordinates in said radiograph at which is located a pixel, of a plurality of pixels in said detected portion wherein said changes in said density values of said pixels are concave in shape, that has the minimum density value, and the coordinates in said radiograph at which is located said pixel, of a plurality of pixels in said detected portion wherein said changes in said density values of said pixels are convex in shape, that has said maximum density value, and to compare the coordinates in said radiograph at which is located said pixel, of said plurality of pixels in said detected portion wherein said changes in said density values of said pixels are convex in shape, that has said maximum density value with the coordinates in said radiograph at which is located said pixel, of said plurality of pixels in said detected portion wherein said changes in said density values of said pixels are concave in shape, that has said minimum density value; and wherein said discrimination circuit employs the result obtained by said comparison circuit to identify the radiographic posturc of said subject in said radiograph.

24. An image discrimination apparatus according to claim 20, wherein said discrimination circuit comprises:

an uneven portion detection circuit adapted to detect a portion whereat said changes in said density values of said pixels in said profile formed by said profile forming circuit are concave in shape and a portion whereat said changes are convex in shape; and wherein said discrimination circuit identifies the radiographic posture of said subject in said radiograph based on whether said uneven portion detection circuit has detected said portion wherein said changes in said density values of said pixels is concave in shape.

25. An image discrimination apparatus according to claim 20, wherein said radiograph indicated by said radiographic signal is an image for which a smoothing process is performed.

26. An image discrimination apparatus according to claim 20, further comprising a memoxy medium that is readable by a computer in which is stored a program for permitting said maximum density value coordinate circuit, said profile forming circuit and said discrimination circuit to perform processing, wherein said image discrimination apparatus is aranged so that the processing is controlled by said computer that is operated by said program stored in said memory medium.

27. An image discrimination method, whereby the posture of a subject is identified in a radiograph produced when said subject is radiated with radioactive rays by a radioactive device, comprising:
- (a) a comparison step comprising detecting a density value for a pixel that constitutes a first area, which corresponds to a first radiograph portion indicated by a radiograph signal, and a density value for a pixel that constitutes a second area, which corresponds to a second portion, and comparing the two density values; and
- (b) a discrimination step comprising employing said radiograph to determine the radiographic posture of a subject, wherein said radiograph indicated by said radiographic signal is an image of the chest of a patient, and wherein said first portion is the lungs of said patient and said second portion is the mediastinum.

28. An image discrimination method according to claim 27, wherein said comparison step comprises:
- detecting the maximum density value of a pixel constituting said first area that corresponds to said first portion;
- detecting the minimum density value of a pixel constituting said second area that corresponds to said second portion; and
- comparing said maximum density value with said minimum density value.

29. An image discrimination method according to claim 27, wherein said radiograph indicated by said radiographic signal is an image for which a smoothing process is performed.

30. An image discrimination method according to claim 27, which employs a memory medium that is readable by a computer in which is stored a program for performing processing at said comparison step and said discrimination step, and which is performed by said computer that is operated by said program stored in said memory medium.

31. An image discrimination method, whereby the posture of a subject is identified in a radiograph obtained by a radioactive device irradiating a subject with radioactive rays, comprising:
- (a) a detection step comprising detecting a density value, which serves as a feature, for one pixel of a plurality of pixels that constitute a first area corresponding to a first portion of a radiograph that is indicated by a radiographic signal, and a density value, which serves as a feature, for one pixel of a plurality of pixels that constitute a second area corresponding to a second portion, and determining the distance between the two density values; and
- (b) a discrimination step comprising employing the results obtained at said detection step to identify the radiographic posture of a subject, wherein said radiograph indicated by said radiographic signal is an image of the chest of a patient, and wherein said first portion is the lungs of said patient and said second portion is the mediastinum.

32. An image discrimination method according to claim 31, wherein said detection step comprises:
- detecting the coordinates for the middle point in said first area corresponding to said first portion;
- detecting the coordinates for the middle point in said second area corresponding to said second portion; and
- calculating the distance between the two coordinates.

33. An image discrimination method according to claim 31, wherein said radiograph indicated by said radiographic signal is an image for which a smoothing process is performed.

34. An image discrimination method according to claim 61, wherein said discrimination step includes:
- a comparison step of detecting, as data for a feature, the minimum density value of a pixel in said detected portion wherein said changes in said density values of said pixels are concave shaped, the coordinates in said autoradiograph at which said pixel having said minimum density value is located, the maximum density value of a pixel in said detected portion wherein said changes in said density values of said pixels are convex shaped, and the coordinates in said autoradiograph at which said pixel having said minimum density value is located, and of comparing said maximum density value for said pixel in said detected portion wherein said changes is said density values for said pixels are convex shaped with said minimum density value for said pixel in said detected portion wherein said changes in said density values for said pixels are concave shaped; and wherein said discrimination step is so arranged as to employ the result obtained at said comparison step to identify the radiographic posture of said subject in said autoradiograph.

35. An image discrimination method, whereby the posture of a subject is detected in a radiograph that is obtained by a radioactive device radiating said subject with radioactive rays, comprising:
- (a) a maximum density value coordinate detection step comprising detecting the coordinates for one pixel of a plurality of pixels that constitute a first area corresponding to a first portion of a radiograph that is indicated by a radiograph signal, that has the maximum density value;
- (b) a profile forming step comprising forming a profile of density values for pixels that are located along a line passing though said coordinates in said radiograph at which said pixel is located that has the maximum density value obtained at said maximum density value coordinate calculation step; and
- (c) a discrimination step comprising detecting a portion wherein said changes in said density values of said pixels are concave in shape and a portion where said changes are convex in shape, obtaining, as data for a feature, a density value which serves as a feature for a pixel in said portion wherein said changes in said density values of said pixels are concave in shape and coordinates on said radiograph where said pixel having said density value as said feature is located, and a density value which serves as a feature for a pixel in a portion where said changes are convex in shape and coordinates on said radiograph where said pixel having said density value as said feature is located, and employing said data for the feature to identify the radiographic posture of said subject in said radiograph, wherein said radiograph indicated by said radiographic signal is an image of the chest of a patient, and wherein said first portion is the lungs of said patient and said second portion is the mediastinum.

36. An image discrimination method according to claim 35, wherein said maximum density value coordinate detection step comprises:
- an area extraction step comprising detecting a plain image area indicated by a radiographic signal, and extracting an area other than said plain image area that is detected and an area having a predetermined width that contacts said plain image area; and
- wherein said maximum density value coordinate detection step is arranged so as to detect the coordinates in said radiograph at which is located a pixel of a plurality of pixels that constitute said first area that corresponds to said first position in said area that is extracted at said area extraction step, that has the maximum density value.

37. An image discrimination method according to claim wherein said discrimination step comprises: a comparison step comprising detecting, as data for a feature, the minimum density value of a pixel in said detected portion wherein said changes in said density values of said pixels are concave in shape, the coordinates in said radiograph at which said pixel having said minimum density value is located, the maximum density value of a pixel in said detected portion wherein said changes in said density values of said pixels are convex in shape, and the coordinates in said radiograph at which said pixel having said minimum density value is located, and comparing said maximum density value for said pixel in said detected portion wherein said changes in said density values for said pixels are convex in shape with said minimum density value for said pixel in said detected portion wherein said changes in said density values for said pixels are concave in shape; and wherein said discrimination step employs the result obtained at said comparison step to identify radiographic posture of said subject in said radiograph.

38. An image discrimination method according to claim 35, wherein said discrimination step comprises a comparison step comprising:

detecting, as data for a feature, the coordinates in said radiograph at which is located a pixel of a plurality of pixels in said detected portion wherein said changes in said density values of said pixels are concave in shape, that has the minimum density value, and the coordinates in said radiograph at which is located said pixel of a plurality of pixels in said detected portion wherein said changes in said density values of said pixels are convex in shape, that has said maximum density value, and comparing the coordinates in said radiograph at which is located said pixel of said plurality of pixels in said detected portion wherein said changes in said density values of said pixels are convex in shape, that has said maximum density value with the coordinates in said radiograph at which is located said pixel of said plurality of pixels in said detected portion wherein said changes in said density values of said pixels are concave in shape, that has said minimum density value; and wherein said discrimination step is so arranged as to employ the result obtained at said comparison step to identify the radiographic posture of said subject in said radiograph.

39. An image discrimination method according to claim 35, wherein said discrimination step comprises an uneven portion detection step comprising detecting a portion whereat said changes in said density values of said pixels in said profile formed at said profile forming step are concave in shape and a portion whereat said changes are convex in shape; and wherein said discrimination step is so arranged as to identify the radiographic posture of said subject in said radiograph based on whether said portion wherein said changes in said density values of said pixels is concave in shape has been detected at said uneven portion 40. An image discrimination method according to claim 35, wherein said radiograph indicated by said radiographic signal is an image for which a smoothing process is performed.

41. An image discrimination method according to claim 35, which employs a memory medium that is readable by a computer in which is stored a program for performing processing at said maximum density value coordinate detection step, said profile forming step and said discrimination step, and which is performed by said computer that is operated by said program by said computer that is operated by said program stored in said memory medium.

42. An image discrimination apparatus, which identifies the posture of a subject in a radiograph that is obtained by a radioactive device irradiating said subject with radioactive rays, comprising:

(a) a profile forming circuit configured to receive a radiographic signal, and adapted to form a profile of density values for pixels positioned along a line passing through specific coordinates in a predetermined area of a radiograph that is indicated by said radiographic signal that is entered;

(b) a dent portion detection circuit adapted to detect a portion in said profile formed by said profile forming circuit wherein changes in said density values of said pixels are concave in shape:

(c) a ratio calculation circuit adapted to calculate a ratio of a density value for a pixel in said portion detected by said dent portion detection circuit wherein said changes in said density values of said pixels are concave in shape, to a density value for a pixel in said profile that is formed by said profile forming circuit; and (d) a discrimination circuit adapted to identify the radiographic posture of said subject in said radiograph.

43. An image discrimination apparatus according to claim 42, wherein said predetermined area of said radiograph indicated by said radiograhic signal is an area containing an image of the lungs of a patient.

44. An image discrimination apparatus according to claim 42, wherein said dent portion detection circuit is arranged so as to employ the maximum density value for a pixel in said profile formed by said profile forming circuit adapted to detect said portion wherein said changes in said density values of said pixels are concave in shape.

45. An image discrimination apparatus according to claim 42 wherein said profile forming circuit comprises:

a maximum density value coordinate detection circuit adapted to detect coordinates in said radiograph at which is located said pixel of a plurality of pixels that constitute said predetermined area of said radiograph indicated by said radiographic signal, that has said maximum density value; and wherein said profile forming circuit is arranged so as to form a profile of the density values for pixels that are located along a line passing through said coordinates detected by said maximum density value coordinate detection circuit.

46. An image discrimination apparatus according to claim 42 wherein said profile forming circuit comprises:

an area extraction circuit adapted to extract from said radiograph a subject image area indicated by said radiographic signal; and wherein said profile forming circuit is arranged so as to form a profile of the density values for pixels that are located along a line passing through specific coordinates in said subject image area extracted by said area extraction circuit.

47. An image discrimination apparatus according to claim 46 wherein said area extraction circuit is arranged so as to extract from said radiograph a plain image indicated by said radiographic signal, and to extract as said subject image area an area other than said plain image that is extracted and an area that contacts said plain image at a constant interval.

48. An image discrimination apparatus according to claim 42, further comprising: image processing circuit adapted to employ the results obtained by said discrimination circuit to perform image processing for said radiograph indicated by said radiographical signal.

49. An image discrimination apparatus according to claim 42, further comprising a memory medium that is readable by a computer in which is stored a program for pennittirig said profile forming circuit, said dent portion detection circuit, said ratio calculation circuit and said discrimination circuit to perform processing,
wherein said image discrimination apparatus is arranged so that the processing is controlled by said computer that is operated by said program stored in said memory medium.

50. An image discrimination apparatus, which identifies the posture of a subject on a radiograph that is obtained by a radioactive device irradiating said subject with radioactive rays, comprising:
(a) an area extraction circuit configured to receive an radiographic signal and adapted to extract from a radiograph a subject image area indicated by said radiographic signal;
(b) a maximum density value coordinate calculation circuit adapted to calculate the coordinates in said radiograph at which is located a pixel of a plurality of pixels that constitute said subject image area extracted by said area extraction circuit, that has the maximum density value;
(c) a profile forming ciwuit adapted to form a profile of density values for pixels that are located along a line passing through said coordinates in said radiograph at which is located said pixel that has the maximum density value and that is obtained by said maximum density value coordinate calculation circuit;
(d) a dent portion detection circuit adapted to detect a portion wherein changes in said density values for said pixels in said profile formed by said profile forming circuit are concave in shape;
(e) a ratio calculation circuit adapted to calculate a ratio of a density value for a pixel in said portion detected by said dent portion detection circuit, in which said changes in said density values of said pixels are concave in shape, to a density value of a pixel in said profile formed by said profile forming circuit; and
(f) a discrimination circuit adapted to identify the radiographic posture of said subject in said radiograph.

51. An image discrimination apparatus according to claim 50, wherein said subject image area in said radiograph indicated by said radiographic signal is an area containing an image of the lungs of a patient.

52. An image discrimination apparatus according to claim 50, wherein said dent portion detection circuit is arranged so as to employ the maximum density value for a pixel in said profile formed by said profile forming circuit adapted to detect said portion wherein said changes in said density values of said pixels are concave in shape.

53. An image discrimination apparatus according to claim 50, wherein said area extraction circuit is arranged so as to extract from said radiograph a plain image indicated by said radiographic signal, and to extract as said subject image area an area other than said plain image that is extracted and an area that contacts said plain image at a constant interval.

54. An image discrimination apparatus according to claim 50, further comprising:
an image processing circuit adapted to employ the results obtained by said discrimination circuit to perform image processing for said radiograph indicated by said radiographical signal.

55. An image discrimination apparatus according to claim 50, further comprising a memory medium that is readable by a computer in which is stored a program for permitting said area extraction circuit, said maximum density value coordinate calculation circuit, said profile forming circuit, said dent portion detection circuit, said ratio calculation circuit and said discrimination circuit to perform processing,
wherein said image discrimination apparatus is arranged so that the processing is controlled by said computer.

56. An image discrimination method, whereby the posture of a subject is identified in a radiograph that is obtained by a radioactive device irradiating said subject with radioactive rays, comprising:
(a) a profile forming step comprising forming a profile of density values for pixels positioned along a line passing through specific coordinates in a predetermined area of a radiograph that is indicated by a radiographic signal that is entered;
(b) a dent portion detection step comprising detecting a portion in said profile formed at said profile forming step wherein changes in said density values of said pixels are concave in shape;
(c) a ratio calculation step comprising calculating a ratio of a density value for a pixel in said portion detected at said dent portion detection step wherein said changes in said density values of said pixels are concave in shape, to a density value for a pixel in said profile that is formed at said profile forming step; and
(d) a discrimination step comprising identifying the radiographic posture of said subject in said radiograph.

57. An image discrimination method according to claim 56, wherein said predetermined area of said radiograph indicated by said radiographic signal is an area containing an image of the lungs of a patient.

58. An image discrimination method according to claim 56, wherein said dent portion detection step employs the maximum density value for a pixel in said profile formed at said profile forming step to detect said portion
wherein said changes in said density values of said pixels are concave in shape.

59. An image discrimination method according to claim 56, wherein said profile forming step comprises:
a maximum density value coordinate detection step comprising detecting coordinates in said radiograph at which is located said pixel of a plurality of pixels that constitute said predetermined area of said radiograph indicated by said radiographic signal, that has said maximum density value; and wherein said profile forming step is arranged so as to form a profile of the density values for pixels that are located along a line passing though said coordinates detected at said maximum density value coordinate detection step.

60. An image discrimination method according to claim 56, wherein said profile forming step comprises:
an area extraction step comprising extracting from said radiograph a subject image area indicated by said radiographic signal; and wherein said profile forming step is arranged so as to form a profile of the density values for pixels that are located along a line passing through specific coordinates in said subject image area extracted at said area extraction step.

61. An image discrimination method according to claim 60, said area extraction step comprises extracting from said radiograph a plain image indicated by said radiographic signal, and extracting as said subject image area an area other than said plain image that is extracted and an area that contacts said plain image at a constant interval.

62. An image discrimination method according to claim 56, further comprising:
  an image processing step comprising employing the results obtained at said discrimination step to perform image processing for said radiograph indicated by said radiographical signal.

63. An image discrimination method according to claim 56, which employs a memory medium that is readable by a computer in which is stored a program for performing processing at said profile forming step, said dent portion detection step, said ratio calculation step and said discrimination step, and which is performed by said computer that is operated by said program stored in said memory medium.

64. An image discrimination method, whereby the posture of a subject identified on a radiograph that is obtained by a radioactive device irradiating said subject with radioactive rays, comprising:
  (a) an area extraction step comprising extracting from a radiograph a subject image area indicated by a radiographic signal;
  (b) a maximum density value coordinate calculation step comprising calculating the coordinates in said radiograph at which is located a pixel of a plurality of pixels that constitute said subject image area extracted at said area extraction step, that has the maximum density value;
  (c) a profile forming step comprising forming a profile of density values for pixels that are located along a line passing through said coordinates in said radiograph at which is located said pixel that has the maximum density value and that is obtained at said maximum density value coordinate calculation step;
  (d) a dent portion detection step comprising detecting a portion wherein changes in said density values for said pixels in said profile formed at said profile forming step are concave in shape;
  (e) a ratio calculation step comprising calculating a ratio of a density value for a pixel in said portion detected at said dent portion detection step, in which said changes in said density values of said pixels are concave in shape, to a density value of a pixel in said profile formed at said profile forming step; and
  f) a discrimination step comprising identifying the radiographic posture of said subject in said radiograph.

65. An image discrimination method according to claim 64 wherein said subject image area in said radiograph indicated by said radiogaphic signal is an area containing an image of the lungs of a patient.

66. An image discrimination method according to claim 64, wherein said dent portion detection step employs the maximum density value for a pixel in said profile formed at said profile forming step to detect said portion
  wherein said changes in said density values of said pixels are concave in shape.

67. An image discrimination method according to claim 64 wherein said area extraction step is arranged so as to extract from said radiograph a plain image indicated by said radiographic signal, and to extract as said subject image area an area other than said plain image that is extracted and an area that contacts said plain image at a constant interval.

68. An image discrimination method according to claim 64, further comprising:
  an image processing step comprising employing the results obtained at said discrimination step to perform image processing for said radiograph indicated by said radiographical signal.

69. An image discrimination method according to claim which employs a memory medium that is readable by a computer in which is stored a program for performing processing at said area extraction step, said maximum density value coordinate calculation step, said profile forming step, said dent portion detection step, said ratio calculation step and said discrimination step, and which is performed by said computer that is operated by said program stored in said memory medium.

70. An image discrimination method for identifying whether a posture of a subject in chest radiographic image is front or side, comprising:
  (a) an area detection step comprising entering a radiographic signal, detecting a plain image area indicated by said radiographic signal, and detecting an area other than said plain image area that is detected and an area, which is in contact with said plain image area, having a predetermined width;
  (b) a profile forming step comprising forming, from the chest radiographic image other than the detected plain area, a profile of a direction perpendicular to a body side;
  (c) a dent portion detection step comprising detecting a dent portion in the formed profile; and
  (d) a judgment step comprising judging that the posture of the subject of the radiographic image is front when the dent portion is present in the formed profile.

71. An image discrimination method according to claim 70, further comprising a feature point detection step comprising detecting a feature point of the chest image from the chest radiographic image other than the detected plain area,
  wherein said profile forming step comprises forming the profile so as to pass the detected feature point.

72. An image discrimination apparatus, which identifies whether a posture of a subjcct in chest radiographic image is front or side, comprising:
  (a) an area detection circuit configured to receive a radiographic signal, and adapted to detect a plain image area indicated by said radiographic signal, and to detect an area other than said plain image area that is detected and an area, which is in contact with said plain image area, having a predetermined width;
  (b) a profile forming circuit adapted to form, from the chest radiographic image other than the detected plain area, a profile of a direction perpendicular to a body side;
  (c) a dent portion detecting circuit adapted to detect a dent portion in the formed profile; and
  (d) a judgement circuit adapted to judge that the posture of the subject of the radiographic image is front when the dent portion is present in the formed profile.

73. An article of manufacture comprising a computer readable medium having computer readable program code embodied therein, which when executed causes a computer to:
  enter a radiographic signal;
  detect a plain image area indicated by said radiographic signal;
  detect an area other than said plain image area that is detected and an area, which is in contact with said plain image area, having a predetermined width;
  form from the chest radiographic image other than the detected plain area, a profile of a direction perpendicular to a body side;

detect a dent portion in the fonned profile; and judge that the posture of the subject of the radiographic image is front when the dent portion is present in the formed profile.

74. An image discrimination apparatus, which extracts data for a feature from a radiograph that is produced when a subject is irradiated with radioactive rays by a radioactive device and which employs the obtained data for the feature to identify category of said subject in said radiograph, comprising:

(a) an area extraction circuit configured to receive a radiographic signal, and adapted to detect a plain image area indicated by said radiographic signal, and to extract an area other than said plain image area that is detected and an area, which is in contact with said plain image area, having a predetermined width;

(b) a pixel coordinates calculation circuit adapted to calculate coordinates of a pixel which indicates a high density value in the radiographic area extracted by said area extraction circuit;

(c) a feature data calculation circuit adapted to calculate the data for the feature of said radiograph by employing said coordinates of the pixel; and (d) a discrimination circuit adapted to employ said data for said feature calculated by said feature data calculation circuit to identify the category of said subject in said radiograph.

75. An article of manufacture comprising a computer readable medium having computer readable program code embodied therein, which when executed causes a computer, which extracts data for a feature from a radiograph that is produced when a subject is irradiated with radioactive rays by a radioactive device and which employs the obtained data for the feature to identify category of said subject in said radiograph, to:

(a) receive a radiographic signal;

(b) detect a plain image area indicated by said radiographic signal;

(c) extract an area other than said plain image area that is detected and an area, which is in contact with said plain image area, having a predetermined width;

(d) calculate coordinates of a pixel which indicates a high density value in said extracted radiographic area;

(e) calculate data for a feature of a radiograph by employing said coordinates of the pixel; and (f) employ said data for said feature to identify a category of said subject in said radiograph.

* * * * *

UNITED STATES PATENT AND TRADEMARK OFFICE
CERTIFICATE OF CORRECTION

PATENT NO.    : 6,594,380 B2
DATED         : July 15, 2003
INVENTOR(S)   : Hiroyuki Shinbata It is certified that error appears in the above-identified patent and that said Letters Patent is hereby corrected as shown below:

Column 19,
Line 62, delete the word "appatatus" and insert the word -- apparatus --.

Column 21,
Line 13, delete the words "or said subject" and insert the words -- of said subject --.

Column 21,
Line 17, delete the words "13, wherein" and insert the words -- , wherein --.
Line 26, delete the word "companson" and insert the word -- comparison --.

Column 22,
Line 35, delete the word "identities" and insert the word -- identifies --.

Column 23,
Line 55, delete the word "valne" and insert the word -- value --.
Line 67, delete the word "radiogaph" and insert the word -- radiograph --.

Column 24,
Line 39, delete the word "posturc" and insert the word -- posture --.
Line 57, delete the word "memoxy" and insert the word -- memory --.
Line 62, delete the word "aranged" and insert the word -- arranged --.

Column 26,
Lines 1-22, delete the words "61, wherein said discrimination step includes: a comparison step of detecting, as data for a feature, the minimum density value of a pixel in said detected portion wherein said changes in said density values of said pixels are concave shaped, the coordinates in said autoradiograph at which said pixel having said minimum density value is located, the maximum density value of a pixel in said detected portion wherein said changes in said density values of said pixels are convex shaped, and the coordinates in said autoradiograph at which said pixel having said minimum density value is located, and of comparing said maximum density value for said pixel in said detected portion wherein said changes in said density values for said pixels are convex shaped with said minimum density value for said pixel in said detected portion wherein said changes in density values for said pixels are concave shaped; and wherein said discrimination step is so arranged as to employ the result obtained at said comparison step to identify the radiographic posture of said subject in said autoradiograph." and insert the words -- 31, which employs a memory medium that is readable by a computer in which is stored a program for performing processing at said comparison step and said discrimination step, and which is performed by said computer that is operated by said program stored in said memory medium. --
Line 35, delete the word "though" and insert the word -- through --.

UNITED STATES PATENT AND TRADEMARK OFFICE
CERTIFICATE OF CORRECTION

PATENT NO. : 6,594,380 B2
DATED : July 15, 2003
INVENTOR(S) : Hiroyuki Shinbata

It is certified that error appears in the above-identified patent and that said Letters Patent is hereby corrected as shown below:

Column 27,
Line 2, after the words "according to claim" and insert the word -- 35 --.
Line 63, after the words "said uneven portion" and insert the words -- detection step. --.

Column 29,
Line 5, delete the word "radiographical" and insert the word -- radiographic --.
Line 8, delete the word "pennittirig" and insert the word -- permitting --.
Line 30, delete the word "ciwuit" and insert the word -- circuit --.
Line 40, delete the words "(c) a ratio calculation" and insert the words -- (e) a ratio calculation --.

Column 30,
Line 2, delete the word "radiographical" and insert the word -- radiographic --.
Line 11, after the words "by said computer" insert the words -- that is operated by said program stored in said memory medium. --.
Line 54, delete the word "though" and insert the word -- through --.

Column 31,
Line 9, delete the word "radiographical" and insert the word -- radiographic --.
Line 17, delete the words "of a subject identified" and insert the words -- of a subject is identified --.

Column 32,
Line 2, delete the word "radiographical" and insert the word -- radiographic --.
Line 3, after the words "according to claim" insert the word -- 64 --.
Line 37, delete the word "subjcct" and insert the word -- subject --.
Line 51, delete the word "judgement" and insert the word -- judgment --.

UNITED STATES PATENT AND TRADEMARK OFFICE
CERTIFICATE OF CORRECTION

PATENT NO. : 6,594,380 B2
DATED : July 15, 2003
INVENTOR(S) : Hiroyuki Shinbata

It is certified that error appears in the above-identified patent and that said Letters Patent is hereby corrected as shown below:

Column 33,
Line 1, delete the word "formed" and insert the word -- formed --.

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,594,380 B2
DATED : July 15, 2003
INVENTOR(S) : Hiroyuki Shinbata

It is certified that error appears in the above-identified patent and that said Letters Patent is hereby corrected as shown below:

Column 19,
Line 62, delete the word "appatatus" and insert the word -- apparatus --.

Column 21,
Line 13, delete the words "or said subject" and insert the words -- of said subject --.

Column 21,
Line 17, delete the words "13, wherein" and insert the words -- , wherein --.
Line 26, delete the word "companson" and insert the word -- comparison --.

Column 22,
Line 35, delete the word "identities" and insert the word -- identifies --.

Column 23,
Line 55, delete the word "valne" and insert the word -- value --.
Line 67, delete the word "radiogaph" and insert the word -- radiograph --.

Column 24,
Line 39, delete the word "posturc" and insert the word -- posture --.
Line 57, delete the word "memoxy" and insert the word -- memory --.
Line 62, delete the word "aranged" and insert the word -- arranged --.

Column 26,
Lines 1-22, delete the words "61, wherein said discrimination step includes: a comparison step of detecting, as data for a feature, the minimum density value of a pixel in said detected portion wherein said changes in said density values of said pixels are concave shaped, the coordinates in said autoradiograph at which said pixel having said minimum density value is located, the maximum density value of a pixel in said detected portion wherein said changes in said density values of said pixels are convex shaped, and the coordinates in said autoradiograph at which said pixel having said minimum density value is located, and of comparing said maximum density value for said pixel in said detected portion wherein said changes in said density values for said pixels are convex shaped with said minimum density value for said pixel in said detected portion wherein said changes in density values for said pixels are concave shaped; and wherein said discrimination step is so arranged as to employ the result obtained at said comparison step to identify the radiographic posture of said subject in said autoradiograph." and insert the words -- 31, which employs a memory medium that is readable by a computer in which is stored a program for performing processing at said detection step and said discrimination step, and which is performed by said computer that is operated by said program stored in said memory medium. --
Line 35, delete the word "though" and insert the word -- through --.

UNITED STATES PATENT AND TRADEMARK OFFICE
CERTIFICATE OF CORRECTION

PATENT NO. : 6,594,380 B2
DATED : July 15, 2003
INVENTOR(S) : Hiroyuki Shinbata

It is certified that error appears in the above-identified patent and that said Letters Patent is hereby corrected as shown below:

Column 27,
Line 2, after the words "according to claim" and insert the word -- 35 --.
Line 63, after the words "said uneven portion" and insert the words -- detection step. --.

Column 29,
Line 5, delete the word "radiographical" and insert the word -- radiographic --.
Line 8, delete the word "pennittirig" and insert the word -- permitting --.
Line 30, delete the word "ciwuit" and insert the word -- circuit --.
Line 40, delete the words "(c) a ratio calculation" and insert the words -- (e) a ratio calculation --.

Column 30,
Line 2, delete the word "radiographical" and insert the word -- radiographic --.
Line 11, after the words "by said computer" insert the words -- that is operated by said program stored in said memory medium. --.
Line 54, delete the word "though" and insert the word -- through --.

Column 31,
Line 9, delete the word "radiographical" and insert the word -- radiographic --.
Line 17, delete the words "of a subject identified" and insert the words -- of a subject is identified --.

Column 32,
Line 2, delete the word "radiographical" and insert the word -- radiographic --.
Line 3, after the words "according to claim" insert the word -- 64 --.
Line 37, delete the word "subjcct" and insert the word -- subject --.
Line 51, delete the word "judgement" and insert the word -- judgment --.

UNITED STATES PATENT AND TRADEMARK OFFICE
CERTIFICATE OF CORRECTION

PATENT NO.   : 6,594,380 B2
DATED        : July 15, 2003
INVENTOR(S)  : Hiroyuki Shinbata It is certified that error appears in the above-identified patent and that said Letters Patent is hereby corrected as shown below:

<u>Column 33,</u>
Line 1, delete the word "fonned" and insert the word -- formed --.

This certificate supersedes Certificate of Correction issued December 21, 2004.

Signed and Sealed this

Nineteenth Day of April, 2005

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

Column 19,
Line 62, delete the word "appatatus" and insert the word -- apparatus --.

Column 21,
Line 13, delete the words "or said subject" and insert the words -- of said subject --.
Line 17, delete the words "13, wherein" and insert the words -- 9, wherein --.
Line 26, delete the word "companson" and insert the word -- comparison --.

Column 22,
Line 35, delete the word "identities" and insert the word -- identifies --.

Column 23,
Line 55, delete the word "valne" and insert the word -- value --.
Line 67, delete the word "radiogaph" and insert the word -- radiograph --.

Column 24,
Line 39, delete the word "posturc" and insert the word -- posture --.
Line 57, delete the word "memoxy" and insert the word -- memory --.
Line 62, delete the word "aranged" and insert the word -- arranged --.

Column 26,
Lines 1-22, delete the words "61, wherein said discrimination step includes: a comparison step of detecting, as data for a feature, the minimum density value of a pixel in said detected portion wherein said changes in said density values of said pixels are concave shaped, the coordinates in said autoradiograph at which said pixel having said minimum density value is located, the maximum density value of a pixel in said detected portion wherein said changes in said density values of said pixels are convex shaped, and the coordinates in said autoradiograph at which said pixel having said minimum density value is located, and of comparing said maximum density value for said pixel in said detected portion wherein said changes in said density values for said pixels are convex shaped with said minimum density value for said pixel in said detected portion wherein said changes in density values for said pixels are concave shaped; and wherein said discrimination step is so arranged as to employ the result obtained at said comparison step to identify the radiographic posture of said subject in said autoradiograph." and insert the words -- 31, which employs a memory medium that is readable by a computer in which is stored a program for performing processing at said detection step and said discrimination step, and which is performed by said computer that is operated by said program stored in said memory medium. --.
Line 35, delete the word "though" and insert the word -- through --.

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

Column 27,
Line 2, after the words "according to claim" and insert the word -- 35 --.
Line 63, after the words "said uneven portion" and insert the words -- detection step. --.

Column 29,
Line 5, delete the word "radiographical" and insert the word -- radiographic --.
Line 8, delete the word "pennittirig" and insert the word -- permitting --.
Line 30, delete the word "ciwuit" and insert the word -- circuit --.
Line 40, delete the words "(c) a ratio calculation" and insert the words -- (e) a ratio calculation --.

Column 30,
Line 2, delete the word "radiographical" and insert the word -- radiographic --.
Line 11, after the words "by said computer" insert the words -- that is operated by said program stored in said memory medium. --.
Line 54, delete the word "though" and insert the word -- through --.

Column 31,
Line 9, delete the word "radiographical" and insert the word -- radiographic --.
Line 17, delete the words "of a subject identified" and insert the words -- of a subject is identified --.

Column 32,
Line 2, delete the word "radiographical" and insert the word -- radiographic --.
Line 3, after the words "according to claim" insert the word -- 64 --.
Line 37, delete the word "subjcct" and insert the word -- subject --.
Line 51, delete the word "judgement" and insert the word -- judgment --.

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

<u>Column 33,</u>
Line 1, delete the word "fonned" and insert the word -- formed --.

This certificate supersedes the Certificate of Corrections issued December 21, 2004 and April 19, 2005.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

Column 19,
Line 62, delete the word "appatatus" and insert the word -- apparatus --.

Column 21,
Line 13, delete the words "or said subject" and insert the words -- of said subject --.
Line 17, delete the words "13, wherein" and insert the words -- 9, wherein --.
Line 26, delete the word "companson" and insert the word -- comparison --.

Column 22,
Line 35, delete the word "identities" and insert the word -- identifies --.

Column 23,
Line 55, delete the word "valne" and insert the word -- value --.
Line 67, delete the word "radiogaph" and insert the word -- radiograph --.

Column 24,
Line 39, delete the word "posturc" and insert the word -- posture --.
Line 57, delete the word "memoxy" and insert the word -- memory --.
Line 62, delete the word "aranged" and insert the word -- arranged --.

Column 26,
Lines 2-22, delete the words "61, wherein said discrimination step includes: a comparison step of detecting, as data for a feature, the minimum density value of a pixel in said detected portion wherein said changes in said density values of said pixels are concave shaped, the coordinates in said autoradiograph at which said pixel having said minimum density value is located, the maximum density value of a pixel in said detected portion wherein said changes in said density values of said pixels are convex shaped, and the coordinates in said autoradiograph at which said pixel having said minimum density value is located, and of comparing said maximum density value for said pixel in said detected portion wherein said changes in said density values for said pixels are convex shaped with said minimum density value for said pixel in said detected portion wherein said changes in density values for said pixels are concave shaped; and wherein said discrimination step is so arranged as to employ the result obtained at said comparison step to identify the radiographic posture of said subject in said autoradiograph." and insert the words -- 31, which employs a memory medium that is readable by a computer in which is stored a program for performing processing at said detection step and said discrimination step, and which is performed by said computer that is operated by said program stored in said memory medium. --.
Line 35, delete the word "though" and insert the word -- through --.

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

Column 27,
Line 6, after the words "according to claim" and insert the word -- 35 --.
Line 63, after the words "said uneven portion" and insert the words -- detection step. --.

Column 29,
Line 5, delete the word "radiographical" and insert the word -- radiographic --.
Line 8, delete the word "pennittirig" and insert the word -- permitting --.
Line 30, delete the word "ciwuit" and insert the word -- circuit --.
Line 40, delete the words "(c) a ratio calculation" and insert the words -- (e) a ratio calculation --.

Column 30,
Line 2, delete the word "radiographical" and insert the word -- radiographic --.
Line 11, after the words "by said computer" insert the words -- that is operated by said program stored in said memory medium. --.
Line 54, delete the word "though" and insert the word -- through --.

Column 31,
Line 9, delete the word "radiographical" and insert the word -- radiographic --.
Line 17, delete the words "of a subject identified" and insert the words -- of a subject is identified --.

Column 32,
Line 2, delete the word "radiographical" and insert the word -- radiographic --.
Line 3, after the words "according to claim" insert the word -- 64 --.
Line 37, delete the word "subjcct" and insert the word -- subject --.
Line 51, delete the word "judgement" and insert the word -- judgment --.

UNITED STATES PATENT AND TRADEMARK OFFICE
CERTIFICATE OF CORRECTION

PATENT NO. : 6,594,380 B2
APPLICATION NO. : 09/152873
DATED : July 15, 2003
INVENTOR(S) : Hiroyuki Shinbata It is certified that error appears in the above-identified patent and that said Letters Patent is hereby corrected as shown below:

<u>Column 33,</u>
Line 1, delete the word "fonned" and insert the word -- formed --.

This certificate supersedes all previously issued Certificates of Correction.

Signed and Sealed this

Third Day of February, 2009

JOHN DOLL
*Acting Director of the United States Patent and Trademark Office*